(12) United States Patent
Tokoro

(10) Patent No.: US 6,573,859 B2
(45) Date of Patent: Jun. 3, 2003

(54) RADAR APPARATUS

(75) Inventor: Setsuo Tokoro, Nishikamo-gun (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/750,920

(22) Filed: Jan. 2, 2001

(65) Prior Publication Data

US 2001/0015698 A1 Aug. 23, 2001

(30) Foreign Application Priority Data

Feb. 7, 2000 (JP) .................................... 2000-029242
Feb. 14, 2000 (JP) .................................... 2000-035154
Feb. 23, 2000 (JP) .................................... 2000-046239

(51) Int. Cl.[7] ............................................. G01S 13/93
(52) U.S. Cl. ...................... 342/70; 342/128; 342/133; 342/147; 342/173
(58) Field of Search ......................... 342/70, 71, 72, 342/118, 128, 133, 134, 139, 145–158, 175, 194–197, 385, 417–499, 100, 113, 165–174, 27, 28

(56) References Cited

U.S. PATENT DOCUMENTS

| 4,305,074 A | * | 12/1981 | Barzana et al. ............. 342/100 |
| 4,926,171 A | | 5/1990 | Kelley |
| 5,227,803 A | * | 7/1993 | O'Connor et al. .......... 342/442 |
| 5,467,283 A | | 11/1995 | Butsuen |
| 5,579,011 A | * | 11/1996 | Smrek ........................ 342/113 |
| 5,633,642 A | | 5/1997 | Hoss et al. |
| 5,940,024 A | | 8/1999 | Takagi et al. |
| 5,940,029 A | | 8/1999 | Ninomiya et al. |
| 5,955,967 A | | 9/1999 | Yamada |
| 5,955,991 A | | 9/1999 | Kawakubo |
| 5,999,120 A | | 12/1999 | Yamada |
| 5,999,874 A | | 12/1999 | Winner et al. |
| 6,067,048 A | | 5/2000 | Yamada |
| 6,072,422 A | | 6/2000 | Yamada |
| 6,121,917 A | | 8/2000 | Yamada |
| 6,239,747 B1 | * | 5/2001 | Kaminski ................... 342/442 |

FOREIGN PATENT DOCUMENTS

JP  11142497 A  5/1999
JP  11160423 A  6/1999

* cited by examiner

*Primary Examiner*—Bernarr E. Gregory
(74) *Attorney, Agent, or Firm*—Finnegan, Henderson, Farabow, Garrett & Dunner, L.L.P.

(57) ABSTRACT

A radar apparatus of the present invention is provided with a reception array antenna having a plurality of antenna elements, a first bearing detector for detecting a bearing of a target by carrying out signal processing on individual element signals received on an element-by-element basis through the respective antenna elements, and a second bearing detector for detecting a bearing of a target by carrying out signal processing different from that of the first bearing detector, on the individual element signals received through the respective antenna elements. Since the radar apparatus is provided with the two detectors of the first bearing detector and second bearing detector as means for acquiring the target bearing, both or either one of the results of detection by the two detectors can be selectively utilized as occasion demands.

17 Claims, 24 Drawing Sheets

RADAR APPARATUS

BACKGROUND OF THE INVENTION

1. Field of the Invention

The present invention relates to a radar apparatus provided with a reception array antenna consisting of a plurality of antenna elements and constructed to detect a bearing of a target by signal processing on individual element signals received through the respective antenna elements.

2. Related Background Art

A bearing of a target can be determined by a scan with an antenna beam narrowed down to a desired width.

Scanning methods can generally be classified into mechanical scanning methods and electronic scanning methods and a digital beamforming (DBF) scanning method can be listed as one of the electronic scanning methods.

The DBF scanning method is a method of carrying out the scan with the antenna beam by making use of the DBF technology in which the antenna beam can be formed in any desired direction by using the array antenna with a plurality of antenna elements as a receiving antenna, performing a phase shift process by digital signal processing on the individual element signals received through the respective antenna elements, and carrying out a synthesis process.

The DBF scanning method eliminates the need for rotation of the antenna, which was required in the mechanical scanning methods. Accordingly, it obviates the need for a driving mechanism for rotating the antenna and thus has the advantages of being resistant to vibration and permitting reduction in size and weight. While making the most of such advantages, research has been conducted heretofore on application to on-vehicle radar apparatus.

Incidentally, for enhancing the bearing resolution in the DBF scanning method, it is necessary to increase the size of the antenna and increase is inevitable in the digital operation load for formation of beam. For that reason, the bearing resolution has a limit under the constraints that the radar apparatus has to be installed in a limited space or that the detection result has to be given within an effective time.

Particularly, the bearing resolution degrades with distance to the target. For example, supposing two preceding cars running with a predetermined spacing between them are targets to be detected, it will become more difficult to separate and detect the two cars as the distance increases.

There were thus needs for the radar apparatus capable of enhancing the bearing resolution as occasion demands.

SUMMARY OF THE INVENTION

A radar apparatus according to the present invention has been accomplished in order to meet such needs and comprises a reception array antenna having a plurality of antenna elements, first bearing detecting means for detecting a bearing of a target by carrying out signal processing on individual element signals received on element-by-element basis through the respective antenna elements, and second bearing detecting means for detecting a bearing of a target by carrying out signal processing different from that of the first bearing detecting means, on the individual element signals received through the respective antenna elements.

Since the apparatus comprises two bearing detecting means of the first bearing detecting means and second bearing detecting means as target bearing acquiring means, both results of the detection by the two means, or either one of results of the detection can be selectively utilized as occasion demands.

It is desirable that the first bearing detecting means impose a lighter operational load for detection of the target bearing than the second bearing detecting means and that the second bearing detecting means posses a higher target bearing resolution than the first bearing detecting means. The first bearing detecting means is applied to detection of a target existing in a relatively near range and the second bearing detecting means to detection of a target existing in a relatively far range.

This radar apparatus is desirably an FM-CW radar apparatus which uses a transmitted signal of frequency-modulated continuous wave and which acquires the distance to the target from a beat frequency between a received signal through the reception array antenna and the transmitted signal.

Further, it is desirable that the apparatus further comprise a reception circuit for acquiring beat signals by mixing the transmitted signal with the received signals through the antenna elements and converting the beat signal gained every antenna element to a digital beat signal, that the first bearing detecting means be means for performing a digital beamforming process on a plurality of element-by-element digital beat signals to form an antenna beam in a plurality of directions and detecting the bearing of the target, and that the second bearing detecting means be means for carrying out an analysis by digital signal processing on a phase difference between the plurality of element-by-element digital beat signals to detect the bearing of the target as point information.

The first bearing detecting means has the advantages of being capable of detecting not only the center position of the target but also the width thereof and necessitating the processing time shorter than the second bearing detecting means, and the second bearing detecting means has the advantage of the bearing resolution higher than the first bearing detecting means. The target can be detected with accuracy by properly selecting a bearing detecting means to be used in consideration of these advantages.

One of criteria for selection of the first and second bearing detecting means can be the magnitude of the beat frequency. For example, the target bearing can be detected using the first bearing detecting means for the beat signal of the beat frequency not more than a predetermined value, and the target bearing can be detected using the second bearing detecting means for the beat signal of the beat frequency larger than the predetermined value.

The beat frequency is proportional to "distance±relative speed." Namely, it is roughly proportional to the distance though there occurs some error depending upon the difference in relative speed. When the target is present in the near range, the beat frequency takes a smaller value than when it is present in the far range.

On the other hand, the bearing resolution of the first bearing detecting means degrades with distance to the target. As the distance to the target increases, it is often the case that it becomes unnecessary to dare to acquire the information about the width of the target.

Thus, the first bearing detecting means is used for the beat signal of the beat frequency not more than the predetermined value, while the second bearing detecting means for the beat signal of the beat frequency larger than the predetermined value, whereby it becomes feasible to acquire the width information for the target in the near range as well while maintaining the necessary bearing resolution throughout the entire range of distances to be detected.

This radar apparatus is desirably provided with beat frequency detecting means for detecting a beat frequency indicating an approximate distance at which a target is assumed to exist, prior to the detection of the bearing of the target by the first bearing detecting means or by the second bearing detecting means.

When the target bearing detection by the first bearing detecting means or by the second bearing detecting means is carried out with limiting the detection to the beat frequency gained by the beat frequency detecting means, the processing time can be reduced greatly, as compared with the case wherein the target bearing detection is carried out throughout the entire beat frequency range.

The first bearing detecting means can detect the bearing of the target from a position of a peak in a power distribution with a variable of bearing and detect the target width from a peak width, i.e., from a width of the distribution at a position where power is lowered by a predetermined amount from the peak position.

If the target width is not less than a predetermined value, there is the possibility of fusion of targets. In that case, the bearing of the target is again detected at the same beat frequency by the second detecting means, whereby the targets can be separately detected.

The second bearing detecting means can be means for detecting the target bearing by an analytical operation using an adaptive array antenna filter (hereinafter referred to as AAAF).

The processing time can be shortened by setting initial values of weights in the analytical operation with AAAF, based on the result of recognition by the first bearing detecting means or based on the result of recognition of target in previous detection.

A radar apparatus according to another aspect of the present invention comprises a reception circuit for mixing a transmitted signal with the received signals through the plurality of antenna elements to acquire beat signals and converting the beat signal gained every antenna element to a digital beat signal, and beat frequency detecting means for detecting a beat frequency indicating an approximate distance at which a target is assumed to exist, each of the first and second bearing detecting means is means for performing a digital beamforming process on a predetermined frequency component of the plurality of element-by-element digital beat signals to form an antenna beam in a plurality of directions and thereby detecting the bearing of the target, the first bearing detecting means performs the digital beamforming process for a frequency detected by the beat frequency detecting means and being not more than a predetermined frequency or for a frequency near said frequency, and the second bearing detecting means performs the digital beamforming process for all frequencies from the predetermined frequency to a maximum frequency of a detection range.

A peak level in a beat frequency spectrum before the DBF synthesis process becomes lower with distance to the target, or with increase in the value of the beat frequency. For that reason, it is possible to fail to detect the peak frequency for a far target.

On the other hand, when the beat frequency spectrum obtained with the antenna beam formed by the DBF synthesis process is compared with that before the DBF synthesis process, the former has a sharper peak rise due to the target when the target is present in the direction of the antenna beam.

Since the DBF synthesis process is carried out for the beat frequencies larger than the predetermined frequency, throughout the entire frequency range up to the maximum frequency of the detection range, according to the present invention, it is feasible to detect a peak of the beat frequency spectrum due to the target, which could be missed in the beat frequency spectrum before the DBF synthesis process.

In addition, for the target in the relatively near range, the peak frequency is detected from the beat frequency spectrum before the DBF synthesis process and the detection of the distance and direction of the target by the DBF synthesis process is carried out at the frequency or at a frequency near it, whereby the operational load becomes smaller than when the DBF synthesis process is carried out throughout the entire frequency range.

The FM-CW radar apparatus of the present invention desirably comprises lane shape acquiring means for acquiring a shape of a lane on which a vehicle is running, when mounted on the vehicle, and is arranged so that when it is determined that a target detected by the first or second bearing detecting means is present on the lane acquired by the lane shape acquiring means, the DBF synthesis process at beat frequencies greater than the beat frequency corresponding to the target is suspended before a new beat frequency is acquired.

When the FM-CW radar apparatus is mounted on a vehicle and used for detecting the behavior of a preceding car running on the same lane, it becomes less necessary to detect vehicles ahead of the preceding car once the preceding car running on the same lane is detected.

In this FM-CW radar apparatus, when the target on the same lane is detected, the detection of the target ahead thereof is suspended, so as to greatly decrease the operational load for the DBF synthesis process.

The radar apparatus according to still another aspect of the present invention comprises a reception circuit for mixing the transmitted signal with the received signals through the plurality of antenna elements to acquire beat signals and converting the beat signal gained every antenna element to a digital beat signal, the first and second bearing detecting means are means for performing the digital beamforming process on the plurality of element-by-element digital beat signals to form an antenna beam in a plurality of directions and thereby detecting the bearing of the target, and the number of antenna beams formed per unit angle in the first bearing detecting means is smaller than that in the second bearing detecting means.

The forming number of antenna beams per unit angle corresponds to a scanning angle resolution or a scan pitch angle. Thus the scanning angle resolution becomes higher while the scan pitch angle becomes smaller with increase in the forming number of antenna beams per unit angle. Namely, in this radar apparatus, the second bearing detecting means has a higher scanning angle resolution and, in other words, a smaller scan pitch angle than the first bearing detecting means.

When the scan pitch angle is predetermined and thus the scanning angle resolution is constant, the length resolution along the scanning direction varies according to the distance to the target. For example, the angle subtended by the target of width A becomes smaller as the distance to the target increases. Therefore, if the scanning angle resolution is constant, the length resolution in the width direction of the target will become lower with distance to the target.

For that reason, if the scanning angle resolution is determined on the basis of the near targets, the length resolution in the scanning direction will become insufficient for the far targets. On the other hand, if the scanning angle resolution is determined on the basis of the far targets, the length resolution in the scanning direction for the near targets will be higher than necessary. The resolution higher than necessary is nothing but execution of the DBF synthesis process toward too many directions, so as to increase the processing time.

However, this radar apparatus solved the above problem by applying the bearing detection by the first bearing detecting means to the near targets and applying the bearing detection by the second bearing detecting means to the far targets.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
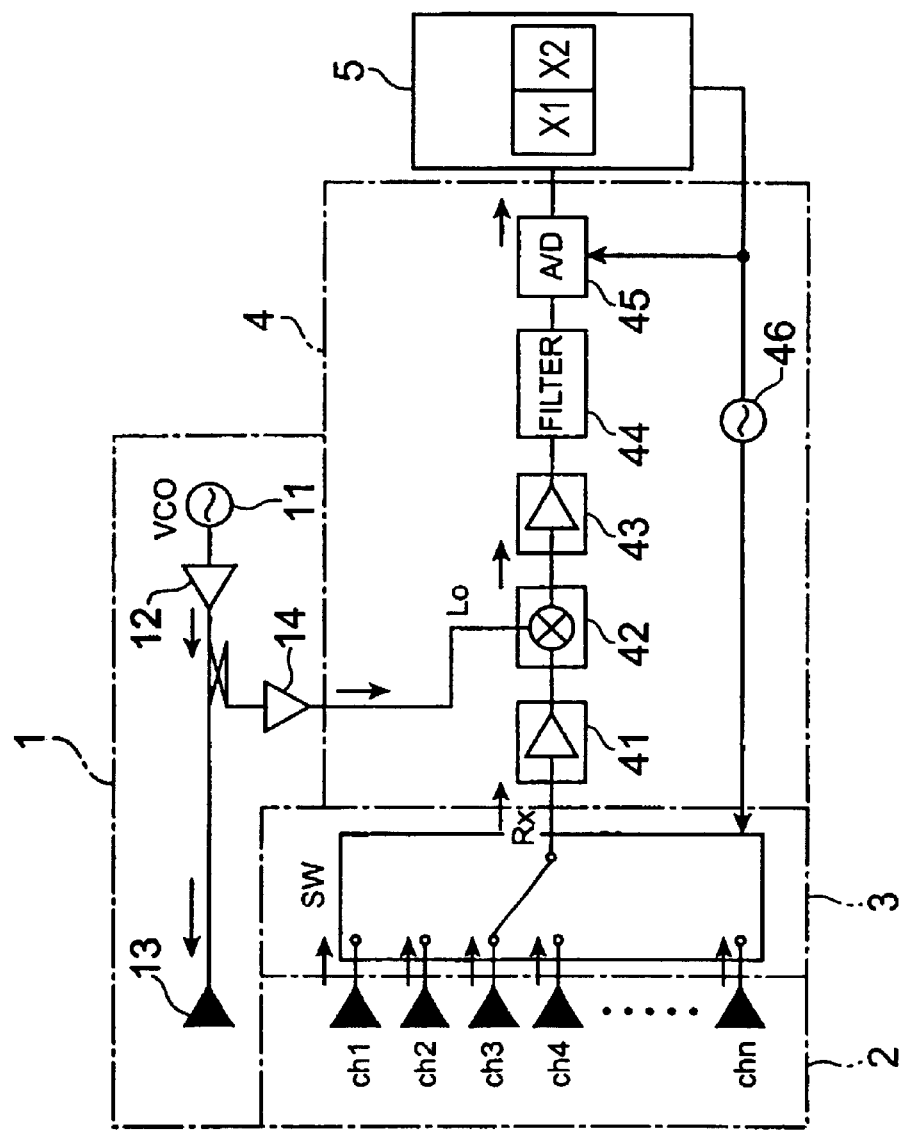
FIG. 1 is a block diagram to show a radar apparatus as an embodiment of the present invention.

FIG. 1 is a block diagram to show a radar apparatus being an embodiment of the present invention. This radar apparatus is an FM-CW radar apparatus using a transmitted signal of frequency-modulated (FM) continuous wave (CW). The apparatus is also a DBF radar apparatus for forming an antenna beam and scanning with the antenna beam by the digital beamforming technology for detecting a bearing of a target. Further, the apparatus is constructed to be able to detect a target bearing as point information by use of an adaptive array antenna filter.

The principle of detection by the FM-CW radar apparatus will be described below, prior to the description of specific structure and operation of the present embodiment.

Figures 2A, 2B:
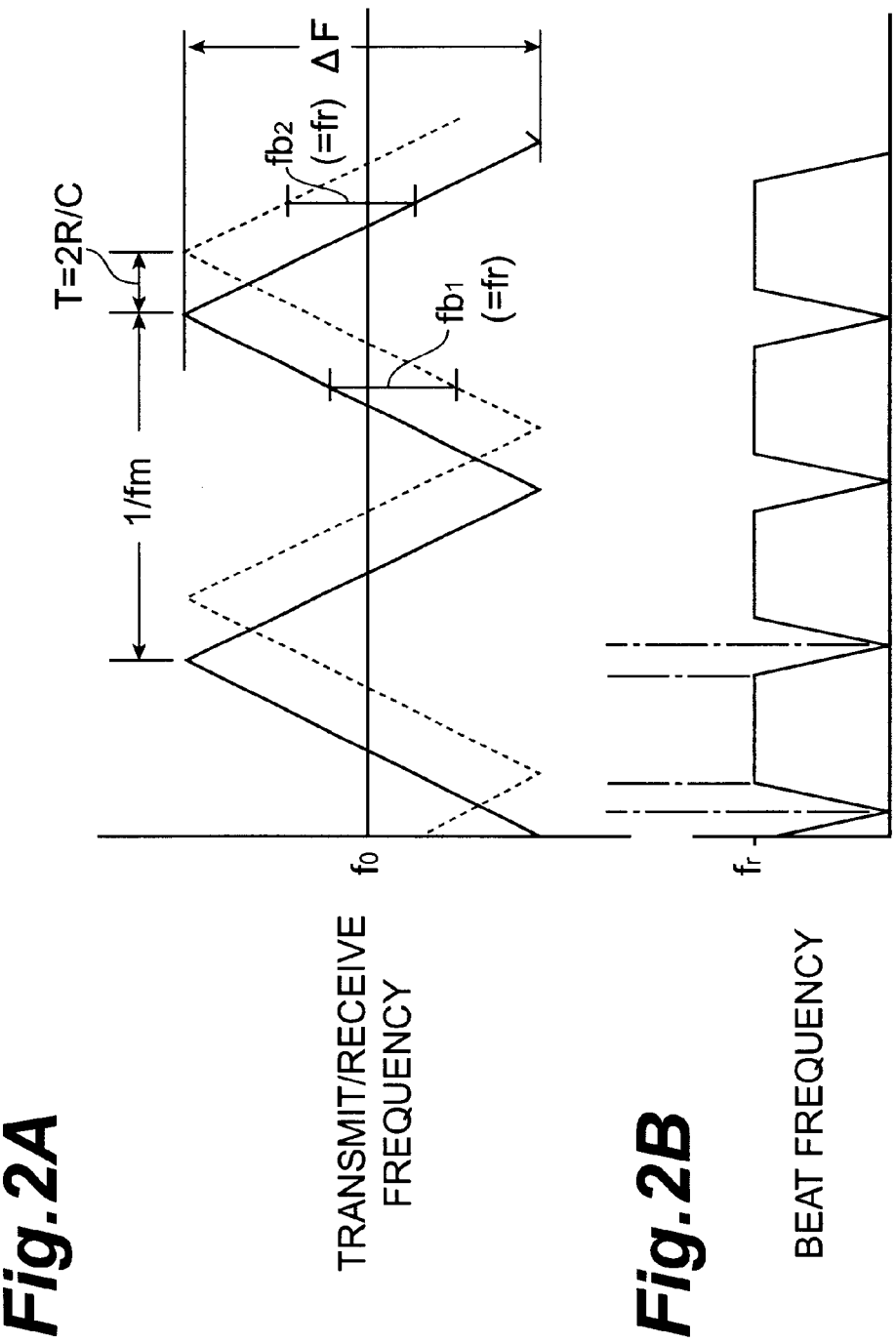
FIG. 2A and FIG. 2B are graphs for explaining the principle of detection by the FM-CW radar.

First, the principle of detection by the FM-CW radar will be described using the graphs of FIGS. 2A, 2B, 3A, and 3C. FIG. 2A is a graph to show change of transmitted frequency by a solid line and change of received frequency reflected from an object (target) with the relative speed of zero and at the position of distance R by a dashed line, in which the axis of ordinate indicates the frequency and the axis of abscissa the time.

As seen from this graph, the transmitted signal is a modulated signal resulting from triangular frequency modulation of continuous wave. The center frequency or carrier frequency of the transmitted signal is f0, the frequency deviation width $\Delta F$, and the repetition frequency of triangular wave fm.

Figures 3A, 3B:
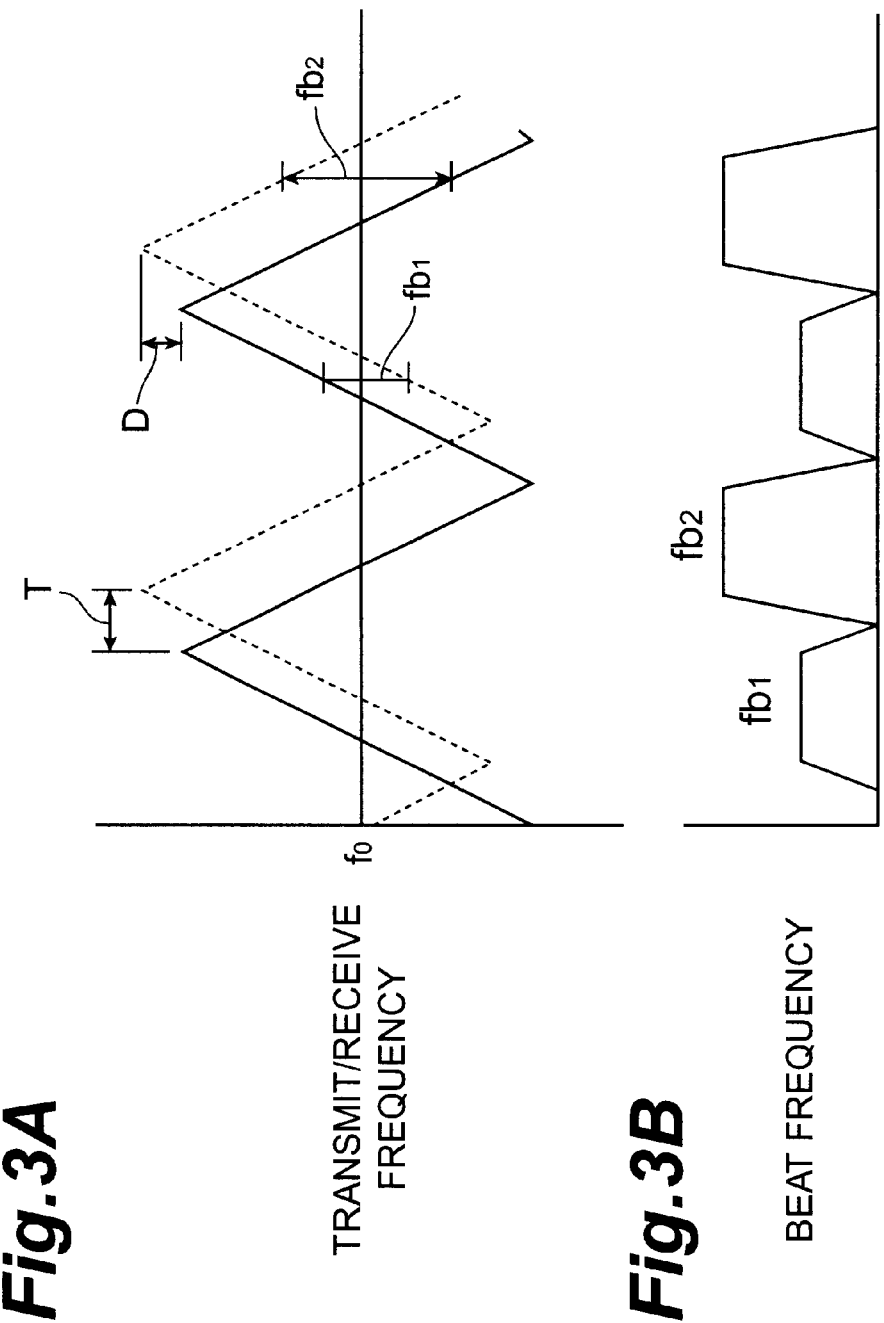
FIG. 3A and FIG. 3B are graphs for explaining the principle of detection by the FM-CW radar.

FIG. 3A is a graph to show change of transmitted signal and change of received signal when the relative speed of the target is not zero but a speed V (V≠0), in which a solid line represents the frequency of the transmitted signal and a dashed line the frequency of the received signal. The transmitted signal and the definition of the coordinate axes are the same as in FIG. 2A.

As seen from FIG. 2A and FIG. 3A, the received signal under radiation of such a transmitted signal is subject to a time delay T (T=2R/C: C is the speed of light) according to the distance when the relative speed of the target is zero, and the received signal is subject to the time delay T according to the distance and a frequency deviation D corresponding to the relative speed when the relative speed of the object is V.

The example illustrated in FIG. 3A shows a case in which the target is approaching, because the frequency of the received signal deviates upward in the same graph.

A beat signal is gained by mixing part of the transmitted signal with this received signal. FIG. 2B and FIG. 3B are graphs to show beat frequencies at the relative speed of target of zero and at the speed V, respectively, the time axis (horizontal axis) of each of which is matched with the timing of FIG. 2A or FIG. 3A.

Now let fr be the beat frequency at the relative speed of zero, fd be the Doppler frequency based on the relative speed, fb1 be the beat frequency of frequency-increasing intervals (up intervals), and fb2 be the beat frequency of frequency-decreasing intervals (down intervals). Then the following equations hold.

$$fb1 = fr - fd \quad (1)$$

$$fb2 = fr + fd \quad (2)$$

By separately measuring the beat frequencies fb1 and fb2 of the up intervals and down intervals in modulation cycles, therefore, fr and fd can be determined from the following equations (3), (4).

$$fr = (fb1 + fb2)/2 \quad (3)$$

$$fd = (fb2 - fb1)/2 \quad (4)$$

Once fr and fd are determined, the distance R and speed V of the object can be derived from Eqs. (5) and (6) below.

$$R = (C/(4 \cdot \Delta F \cdot fm)) \cdot fr \quad (5)$$

$$V = (C/(2 \cdot f0)) \cdot fd \quad (6)$$

Here C represents the speed of light.

The distance R and speed V of the target can be determined as described above. This is the principle of detection by the FM-CW radar apparatus.

The FM-CW radar apparatus being an embodiment of the present invention illustrated in FIG. 1 employs an array antenna with a plurality of antenna elements as a receiving antenna and can form an antenna beam in any desired bearing by carrying out an appropriate phase shift process over the received signals through the respective antenna elements and a synthesis process. Then beam scanning is achieved by successively shifting the desired bearing. The phase shift process and synthesis process of the received signals of the individual antenna elements are carried out by digital operations. Namely, the formation and scanning of the antenna beam is carried out using the digital beamforming (DBF) technology. The DBF technology is well-known and is disclosed, for example, in Japanese Patent Application Laid-Open No. H11-133142.

In the ordinary radar systems to which the DBF technology is applied, high-frequency analog devices such as an RF amplifier for amplifying the received signal, a mixer for mixing the received signal with the transmitted signal to obtain the beat signal, etc. are provided for each antenna element, but the radar apparatus of the present invention is comprised of only one set of such analog devices for the whole apparatus by making use of a high-speed changeover switch.

This radar apparatus is provided with a transmitter section 1, an array antenna 2, a changeover switch 3, a receiver section 4, and a digital signal processing section 5.

The transmitter section 1 is composed of a voltage-controlled oscillator (VCO) 11 having the center frequency of f0 (for example, 76 GHz), a buffer amplifier 12, a transmitting antenna 13, and an RF amplifier 14. The VCO 11 outputs a modulated wave (transmitted signal) of f0±ΔF/2 according to a control voltage supplied from a dc power supply for modulation not illustrated. The modulated wave is amplified by the buffer amplifier 12 and radiates as an electromagnetic wave from the transmitting antenna 13 to a wide range. Part of the transmitted signal is amplified by the RF amplifier 14 and the amplified signal is outputted as a local signal for detection of the received signals.

The reception array antenna 2 is provided with n antenna elements and the switch 3 is disposed behind the reception array antenna 2. The switch 3 has n input terminals and one output terminal, and each of the n antenna elements is connected to a corresponding input terminal. Namely, the first channel to the nth channel independent of each other in the respective antenna elements are formed between each antenna element and the switch 3.

The output terminal of the switch 3 is connected to either one of the n input terminals and the connection is changed over on a periodic basis by a changeover signal (clock signal). The changeover of connection is electrically conducted on circuitry.

The receiver section 4 is provided with an RF amplifier 41, a mixer 42, an amplifier 43, a filter 44, an A/D converter 45, and a changeover-signal oscillator 46. The RF amplifier 41 amplifies an output signal from the output terminal of the switch 3, i.e., a signal received through either antenna element of the array antenna 2, and the mixer 42 mixes it with part of the transmitted signal from the RF amplifier 14. This mixing results in downconverting the received signal to generate a beat signal, which is a difference signal between the transmitted signal and the received signal.

The parallel received signals in the respective channels are subjected to time division at times much shorter than the period of the beat signal by the switch 3 to be converted to serial signals. Therefore, the beat signals outputted from the mixer 42 are also serial beat signals of the respective channels. Each of the beat signals is put through the amplifier 43 and low-pass filter 44 into the A/D converter 45 to be converted to a digital signal at the timing of the output signal from the oscillator 46, i.e., at the timing of the clock signal for changeover of connection by the switch 3.

The digital signal processing section 5 accepts input of the digital beat signals from the A/D converter 45. The signal processing section 5 separates the digital beat signals serially supplied in the respective channels on a channel-by-channel basis and temporarily stores the thus separated signals. Then the signal processing section carries out various processes over the channel-by-channel digital beat signals thus obtained, to acquire the target information, i.e., the distance, relative speed, bearing, and width of the target.

The distance and relative speed are acquired based on the aforementioned principle of detection by the FM-CW radar apparatus. The bearing is acquired by either of the first method of formation and scanning of the antenna beam by the DBF technology and the second method of detecting the bearing as point information by analyzing the phase difference between the channel-by-channel beat signals.

The examples described hereinafter employ the method of carrying out the analytical operation using the adaptive array antenna filter over the channel-by-channel digital beat signals, as the second method.

A variety of embodiments of the digital signal processing section 5 will be described below with flowcharts.

Figure 4:
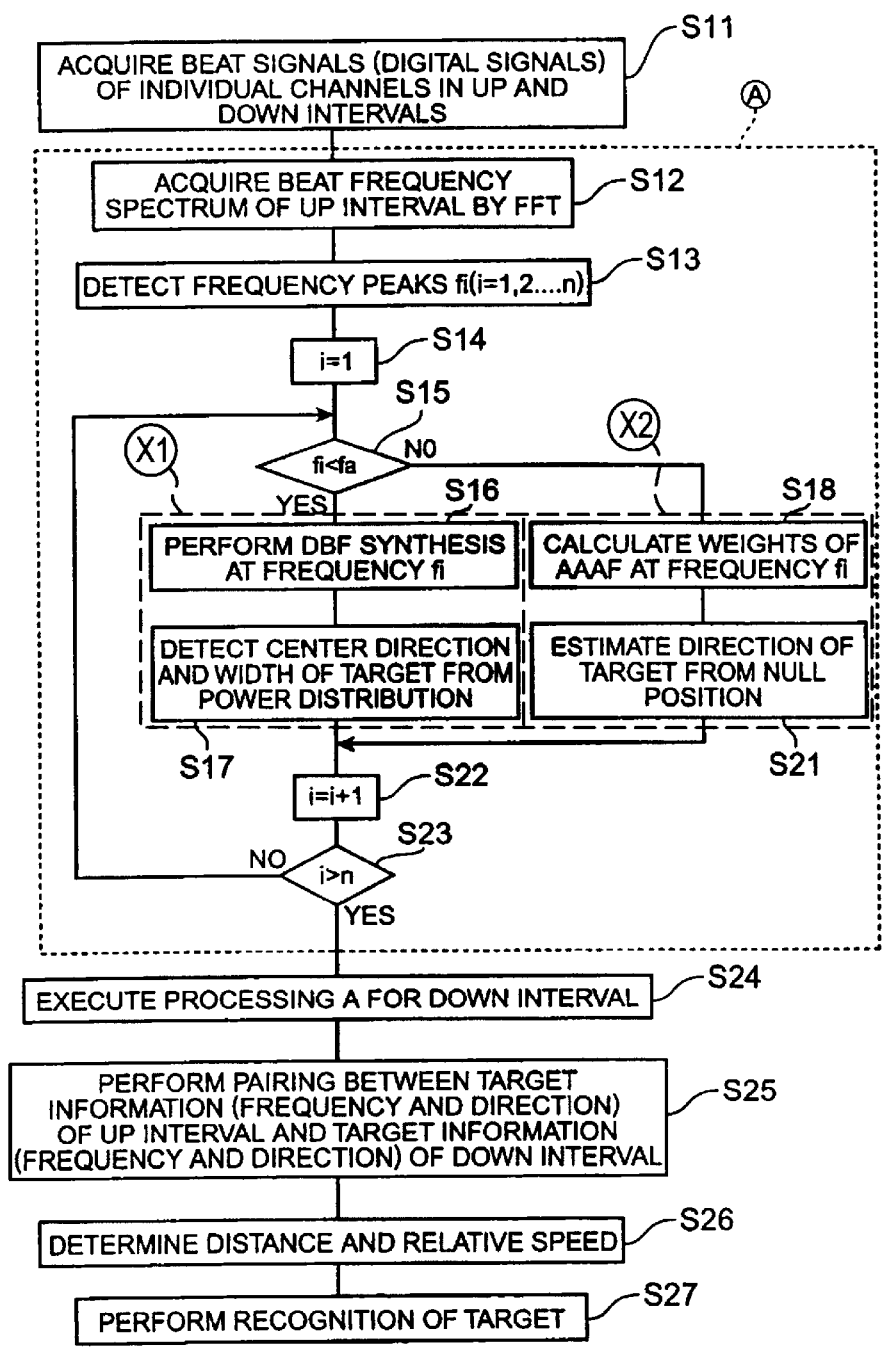
FIG. 4 is a flowchart to show the first embodiment of the present invention.

FIG. 4 is a flowchart to show the first embodiment.

The first step S11 is a step of storing the digital beat signals from the A/D converter 45 separately on a channelby-channel basis. At this time, the digital beat signals are stored for both of the up intervals in which the frequency of the transmitted signal increases and the down intervals in which the frequency decreases.

Steps S12 and S13 compose the beat frequency detecting means for detecting a beat frequency indicating an approximate distance at which a target is assumed to exist, prior to the detection of the target bearing carried out after step S14.

Figure 5:
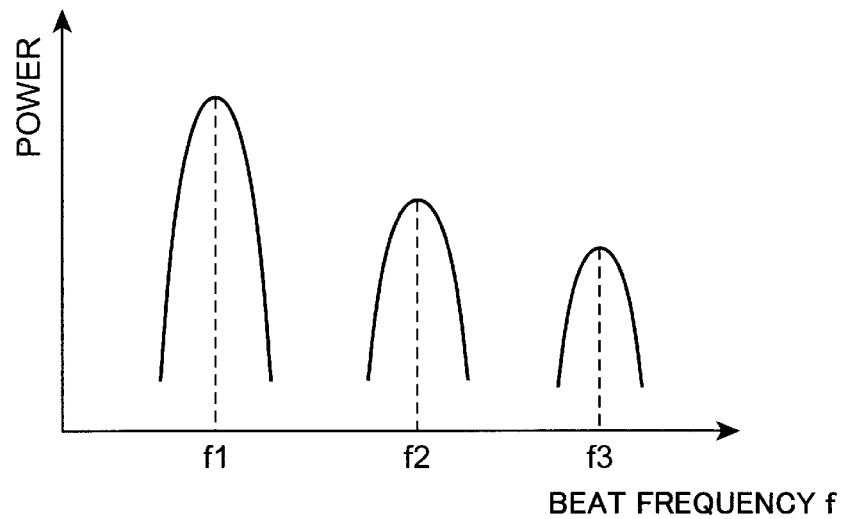
FIG. 5 is a graph to show an example of a beat frequency spectrum in an up interval.

Step S12 is a step of carrying out a fast Fourier transform process (FFT process) over the digital beat signal of the up interval or the down interval for an appropriate channel or for two or more appropriate channels. This gains a beat frequency spectrum of either the up interval or the down interval. Let us suppose here that the beat frequency spectrum of the up interval is acquired. FIG. 5 shows an example of the beat frequency spectrum acquired.

Step S13 is a step of detecting frequency peaks fi (i=1, 2, ..., n) by carrying out a peak search of the beat frequency spectrum gained in step S12. Here the frequency peaks fi are values of beat frequencies corresponding to the peaks of the beat frequency spectrum. In this example, the frequency peaks fi are accompanied by the suffix i=1, 2, ..., n in the ascending order from the smallest beat frequency to the largest frequency.

The peak search in this step S13 may be carried out for an appropriate channel or for a plurality of channels. When the peak search is carried out for plural channels, frequencies detected in either of the channels are employed as frequencies for the synthesis in next step S16. For example, supposing the frequencies f1, f2, and f3 are detected in the channel ch1 and the frequencies f1, f2, and f4 are detected in the channel ch2, fi=f1, f2, f3, and f4.

This prevents a frequency to be used for the synthesis in step S16 from being missed even under such circumstances that a reflected wave from a distant position has a small received power and is not detected in a single channel by accident in the range of detection dispersion because of proximity to the threshold of frequency detection, but it can be detected in another channel.

Since the beat frequency spectrum of the up interval is acquired in step S12, the frequency peaks fi are equivalent to fb1 (=fr−fd) in above Eq. (1). If the beat frequency spectrum of the down interval is acquired, the frequency peaks fi are equivalent to fb2 (=fr+fd) in above Eq. (2).

When this FM-CW radar apparatus is used for on-vehicle use, that is, when it is mounted on a car to be utilized for detection of a preceding car, the beat frequency fr is generally sufficiently larger than the Doppler frequency fd and thus it can be said that each of the frequency peaks fi is approximately proportional to the distance at which the target exists.

Step S14 to step S23 constitute the bearing detecting means. Particularly, steps S16 and S17 constitute the first bearing detecting means X1 for performing the digital beamforming process over the beat signals obtained through the respective antenna elements to effect the formation and scanning of the antenna beam and detecting the bearing of the target, and steps S18 and S21 the second bearing detecting means X2 for analyzing the phase difference between the beat signals obtained through the respective antenna elements to detect the bearing of the target as point information.

Step S14 is a step of setting i=1 for the suffix i of the frequency peak fi. An increment of 1 is added to the value of the suffix i in step 22 and thereafter it is determined in step S23 whether the value of "i" is larger than "n." Here "n" is the suffix attached to the frequency peak of the largest frequency out of the frequency peaks fi detected in step S13.

Through these steps S14, 22, and 23, either of the first bearing detecting means in steps S16 and 17 or the second bearing detecting means in steps S18 and 21 is executed for 1 to n of "i," to detect the target bearing at each frequency peak fi.

Step S15 is a step of determining whether the frequency peak fi is smaller than a preset beat frequency fa. For example, when i=1 is set, it is determined whether the frequency peak f1 is smaller than the beat frequency fa. The beat frequency fa represents a boundary distance for discriminating the far range and the near range from each other and is thus a constant for determining whether the target is in the near range or in the far range.

When the frequency peak fi is smaller than the beat frequency fa, it is determined that the target is in the near range and the bearing thereof is detected by the first bearing detecting means (steps S16, 17). When the frequency peak fi is not less than the beat frequency fa, it is determined that the target is in the far range and the bearing thereof is detected by the second bearing detecting means (steps S18, 21).

Figure 6:
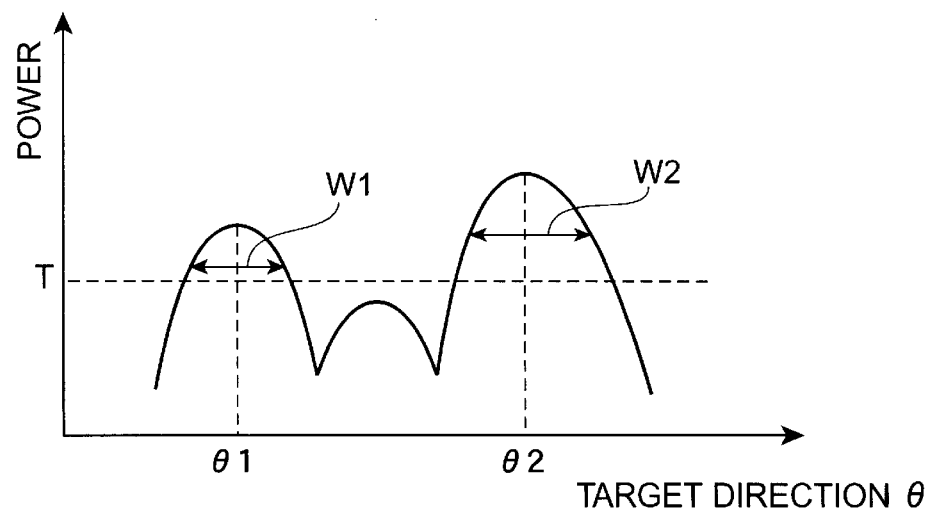
FIG. 6 is a graph to show a power distribution obtained by the first bearing detecting means.

Step S16 is a step of carrying out the DBF synthesis at the frequency peak fi to acquire a power distribution with a variable of the target bearing θ. It is common practice to carry out the DBF synthesis throughout the entire frequency range corresponding to the distance range to be searched, but in the present embodiment the DBF synthesis is carried out only at the limited frequency peak fi, because the distance to the target is already known by the frequency peak fi. FIG. 6 is a graph to show an example of the power distribution at the frequency peak fi (for example, at the frequency peak f1).

Step S17 is a step of determining a bearing or center direction θ and a width W of each target from the power distribution obtained in step S16.

The center direction θ of each target is determined from a bearing indicating a peak over a threshold in the power distribution. For example, in the example of FIG. 6, there appear two peaks at the bearing θ1 and at the bearing θ2 in the range over the threshold T. Peaks below the threshold T are handled as noise. It is seen from this figure that two targets exist in the bearing θ1 and in the bearing θ2, respectively, and at the distance corresponding to the frequency peak fi.

The width W of each target is determined from a width at the position where the power is lowered by a predetermined amount from the peak position. In the example of FIG. 6, the width of the target in the bearing θ1 is W1 and the width of the target in the bearing θ2 is W2.

When the answer is no in step S15, i.e., when it is determined that the target is in the far range, the flow transfers to step S18 to use the second bearing detecting means. Step S18 is a step of computing weights of the adaptive array antenna filter (AAAF) at the frequency peak fi. Since AAAF employs a method of calculating weights to minimize the gain of the direction of the incident wave (received signal), a null point is formed in the direction of incidence. Step S19 is a step of estimating the target bearing from the bearing of this null point. Since this method is based on the assumption that each target is a point, it has the disadvantage that the null point does not always agree with the center direction of the target if the target has a wide angular width. However, the present embodiment applies this step only to the far targets, and thus there occurs no substantial trouble with detection of the bearing on the assumption that each target is a point, because the angular width of each target is very small.

Figure 7:
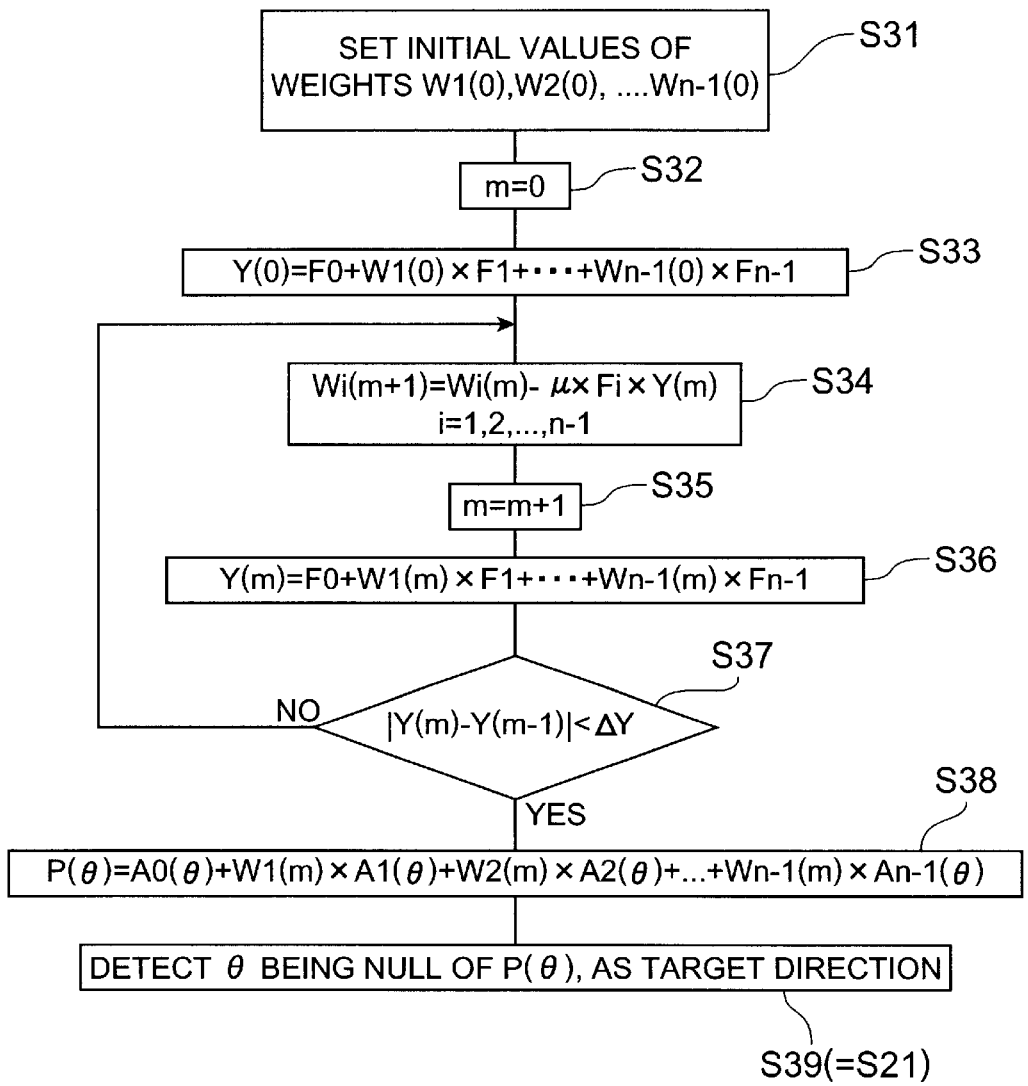
FIG. 7 is a flowchart to show procedures of computation for calculating weights of AAAF.

FIG. 7 is a flowchart to show the procedures of computation to determine the weights of AAAF. In this flowchart, a null synthetic pattern P(θ) below is finally gained as described in step S38 and a bearing θ being a null point of P(θ) is detected as a bearing of a target in step S39.

$$P(\theta) = A0(\theta) + \quad (7)$$
$$W1(m) \times A1(\theta) +$$
$$W2(m) \times A2(\theta) +$$
$$\vdots$$
$$Wn-1(m) \times An-1(\theta)$$

In Eq. (7), Ai(θ) indicates a steering vector in the ith antenna element and is expressed by the following equation.

$$Ai(\theta) = \exp(j \cdot 2\pi \cdot di \cdot \sin\theta/\lambda) \quad (8)$$

Since the first antenna element is used as a reference antenna element in this example, the suffix i for the first antenna element is 0 and the suffix i for the nth antenna element is n−1 (i=0, 1, . . . , n−1).

In the above equation,
di: distance from the reference antenna element,
λ: wavelength,
θ: direction of incoming wave.

Wi(m) in Eq. (7) represents a weight for the ith antenna element, which is determined by the steepest descent method illustrated in the flowchart of FIG. 7, and is a complex number.

Next, the weight computation will be described below according to the flowchart of FIG. 7.

Step S31 is a step of setting initial weights W0(0), W1(0), W2(0), . . . , Wn−1(0). However, since W0(0) corresponds to the reference antenna element, the value thereof is "1." The initial values may be arbitrary values. It is also conceivable to set desired initial values according to circumstances, but it is not discussed herein.

Then m=0 is set in step S32 and thereafter step S33 is carried out to obtain an antenna synthetic output Y(m) for m=0, i.e., Y(0).

$$Y(0) = F0 + \quad (9)$$
$$W1(0) \times F1 +$$
$$W2(0) \times F2 +$$
$$\vdots$$
$$Wn-1(0) \times Fn-1$$

Here F0 to Fn−1 are powers (complex numbers) of the received signals in the respective channels at the frequency peak fi.

Next, step S34 is a step of performing the following operation for i=1, 2, . . . , n−1.

$$Wi(m+1) = Wi(m) - \mu \times Fi^* \times Y(m) \quad (10)$$

Eq. (10) is a formula for asymptotically calculating an optimal weight. Fi* is a complex conjugate of Fi and μ is a step function.

Next, step S35 is a step of setting m=m+1 to give an increment to the m value. This increment to the m value causes Wi(m+1) obtained by Eq. (10) to replace Wi(m). At the stage where only the initial values Wi(0) of the weights are set, Wi(1) is determined here.

Step S36 is a step of calculating an antenna synthetic output Y(m), using the weights Wi(m) obtained by the processes in steps S34, 35.

$$Y(m) = F0 + \quad (11)$$
$$W1(m) \times F1 +$$
$$W2(m) \times F2 +$$
$$\vdots$$
$$Wn-1(m) \times Fn-1$$

Next, step S37 is a step of calculating an absolute value of a difference between the antenna synthetic output Y(m) determined in step S36 and the antenna synthetic output Y(m−1) in the preceding operation and comparing it with a preset tolerance ΔY. When the absolute value satisfies the following relation:

$$|Y(m)-Y(m-1)| < \Delta Y \quad (12),$$

it is determined that optimal weights were determined and the flow transfers to step S38 to obtain the null synthetic pattern P(θ) based on Eq. (7). When Eq. (12) is not met, the flow returns to step S34 to again carry out the processes from step S34 to step S36. Namely, the operational processes from step S34 to step S36 are repeatedly carried out before Eq. (12) is met.

Figure 8:
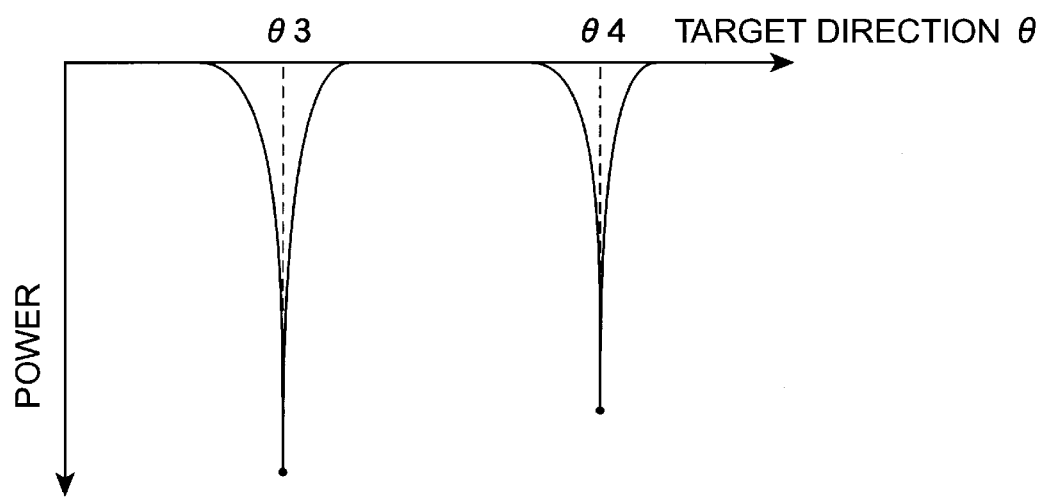
FIG. 8 is a graph to show a power distribution obtained by the second bearing detecting means.

FIG. 8 shows an example of the null synthetic pattern obtained in this way. It is seen from this figure that null points are generated at the bearings of θ3 and θ4. At this time, it is assumed in step S39 (=step S21) that targets exist in the bearing θ3 and in the bearing θ4, respectively.

Now the flow returns to the flowchart of FIG. 4. In the processing A consisting of step S12 to step S23, as described above, the bearing of each target is detected by either the first bearing detecting means (steps S16, 17) or the second bearing detecting means (steps S18, 21) for each of the frequency peaks fi, using the beat frequency spectrum of the up interval. Since approximate distances of the targets can also be acquired at this point from the frequency peaks fi, it is feasible to detect the distance and bearing of each target and also detect the width of target, particularly, for near targets.

In the present embodiment, steps S24 and 25 are carried out in order to further acquire the relative speed of target and acquire the distance more accurately.

Step S24 is a step of carrying out processing similar to the processing A, using the beat frequency spectrum of the down interval. This provides the bearing and beat frequency of each target in the down interval.

Step S25 is a step of performing a pairing process between information pieces assumed to be information concerning the same target, out of the target information of the up interval (beat frequency and direction) and the target information of the down interval (beat frequency and direction). For example, information pieces with bearings equal to each other and with beat frequencies close to each other are paired.

Step S26 is a step of calculating the distance and relative speed of the target according to Eq. (3) to Eq. (6), for each pair of two target information pieces paired in step S25.

Finally, step S27 is a step of carrying out a recognition process, for example, for determining a type of each target from the target information acquired heretofore.

If the relative speed information is not required, the target recognition may be carried out with only the result of the processing A, omitting step S24 to step S26.

Figure 9:
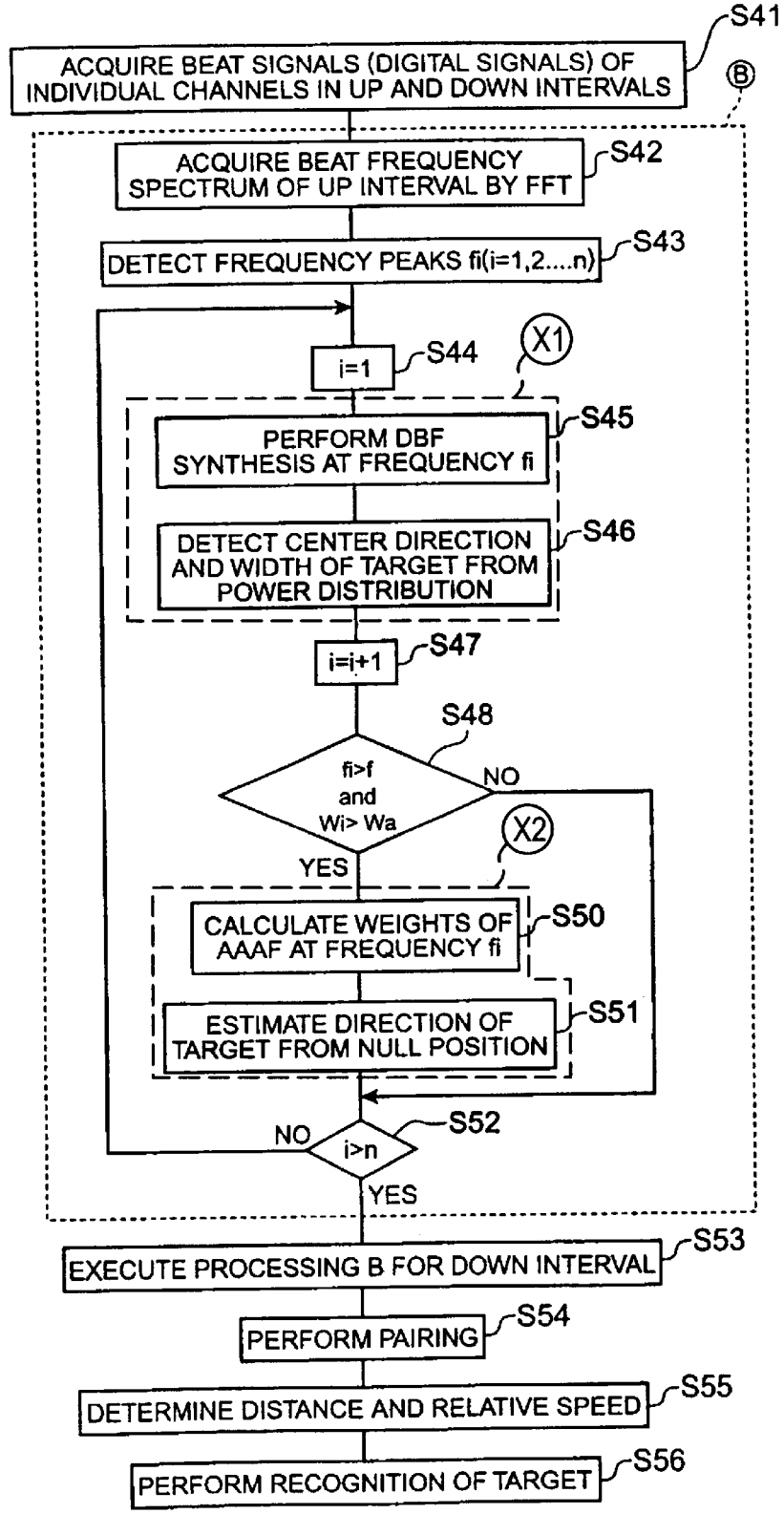
FIG. 9 is a flowchart to show the second embodiment of the present invention.

Next, the second embodiment of the present invention will be described with the flowchart of FIG. 9.

In the first embodiment illustrated in the flowchart of FIG. 4, the apparatus was constructed to use the first bearing detecting means for near targets and use the second bearing detecting means for far targets.

In contrast with it, the radar apparatus of the present embodiment is arranged to use the first bearing detecting means for all distances and again perform the detection using the second bearing detecting means for a target in the far range and over a predetermined width from the result of the detection by the first bearing detecting means.

Step S41 to step S43 are the same as step S11 to step S13 in the flowchart of FIG. 4. Specifically, step S41 is a step of storing the digital beat signals on a channel-by-channel basis, step S42 a step of acquiring the beat frequency spectrum of either the up interval or the down interval, and step S43 a step of detecting the frequency peaks fi of the beat frequency spectrum.

Step S44 to step S52 constitute the bearing detecting means. Steps S45 and 46 are the same as steps S16 and 17 in the flowchart of FIG. 4 and constitute the first bearing detecting means X1 for detecting the bearing of the target by carrying out the formation and scanning of the antenna beam based on the DBF technology. Steps S50 and 51 are the same as steps S18 and 21 in the flowchart of FIG. 4 and constitute the second bearing detecting means X2 for detecting the bearing of the target as point information by use of AAAF.

The bearing detecting means comprised of step S44 to step S52 are executed for each of the frequency peaks fi (i=1, 2, ..., n) detected in step S43, and the flow transfers to step S53 after the target bearings have been detected for the frequency peaks fn through the steps S44, 47, and 52.

Step S48 is a step of determining whether the second bearing detecting means of target (steps S50 and 51) is to be further executed for a detected target, based on two conditions consisting of the target width Wi detected by the first bearing detecting means of steps S45 and 46 and the frequency fi corresponding to the target distance.

The condition of fi>fa means that a target is in the far range. The condition of Wi>Wa means that the width of the target detected is too wide and there is a high possibility of fusion of plural targets.

When these two conditions are met, the bearing detection is again carried out using the second bearing detecting means with higher resolution.

The number of executions by the second bearing detecting means is smaller in the present embodiment than in the first embodiment. In general, the operational load of the second bearing detecting means is larger than that of the first bearing detecting means. Thus the operational load can be reduced as a whole and in turn the detection time can be reduced by the present embodiment.

It is also noted that more proper target information can be acquired by carrying out the similar processing for the down interval in step S53 and further carrying out the pairing, the distance and relative speed determining operation, and executing the target recognition, similar to those in the first embodiment, in steps S54 to 56.

In the present embodiment the threshold Wa of the target width is a fixed value preliminarily set, but it can be set to a value determined based on the frequency fi, bearing θ, and reflection level P. Namely, the threshold can be given by the following.

Wa=function (fi, θ, P)

or

Wa=map (fi, θ, P)

In general, the possibility of fusion of targets increases as the distance increases, as the target width increases, as the reflection level increases, or as the target direction deviates from the center.

Figure 10:
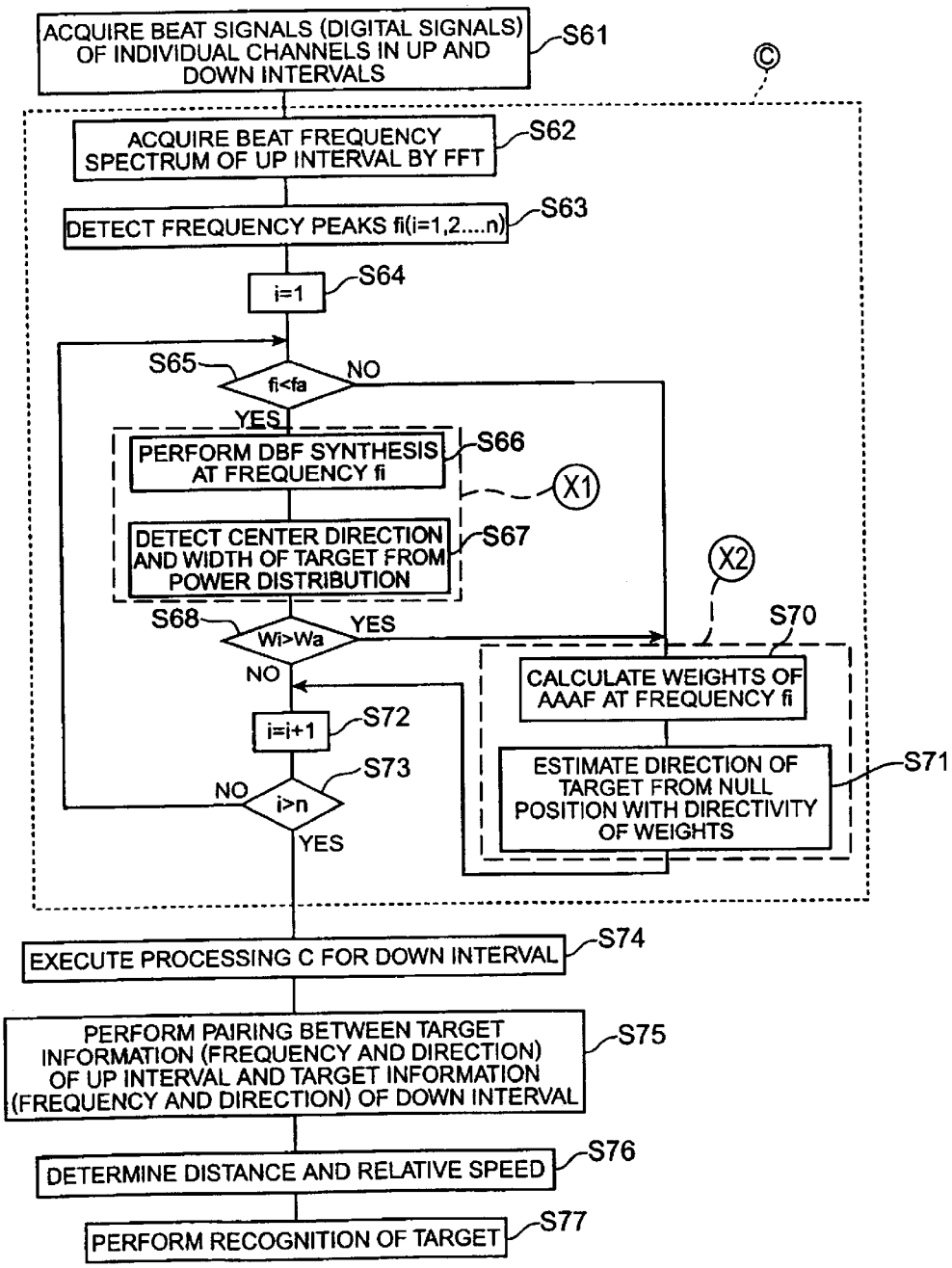
FIG. 10 is a flowchart to show the third embodiment of the present invention.

Next, the third embodiment of the present invention will be described with the flowchart of FIG. 10.

The apparatus of the first embodiment illustrated in the flowchart of FIG. 4 used the first bearing detecting means for near targets and the second bearing detecting means for far targets. The apparatus of the second embodiment of FIG. 9 used the first bearing detecting means for all distances and again performed the detection using the second bearing detecting means for the target in the far range and over the predetermined width from the detection result of the first bearing detecting means.

In contrast with it, the apparatus of the present embodiment uses the first bearing detecting means for near targets and the second bearing detecting means for far targets and again performs the detection using the second bearing detecting means if the width of a near target acquired by the first bearing detecting means is not less than a predetermined width.

The apparatus of the present embodiment can separate near targets even if they are fused in the result of the detection for near targets by the first bearing detecting means. Supposing the present apparatus is an FM-CW radar apparatus for on-vehicle use, two cars running close to each other can undergo fusion in the detection result by the first bearing detecting means. Even under such circumstances, the targets can be separately detected by the second bearing detecting means.

Step S61 to step S63 are the same as step S11 to step S13 of the first embodiment. Step S74 to step S77 are the same as step S24 to step S27 of the first embodiment.

Steps S66 and 67 constitute the first bearing detecting means X1 and steps S70 and 71 the second bearing detecting means X2. If a target is judged as a near target in the determination step S65, the flow transfers to step S66 to apply the first bearing detecting means X1. If a target is judged as a far target, the flow transfers to step S70 to apply the second bearing detecting means X2. When it is determined in the determination step S68 that the width of the near target detected by the first bearing detecting means X1 is larger than the predetermined value Wa, the flow transfers to step S70 to apply the second bearing detecting means X2.

Figure 11:
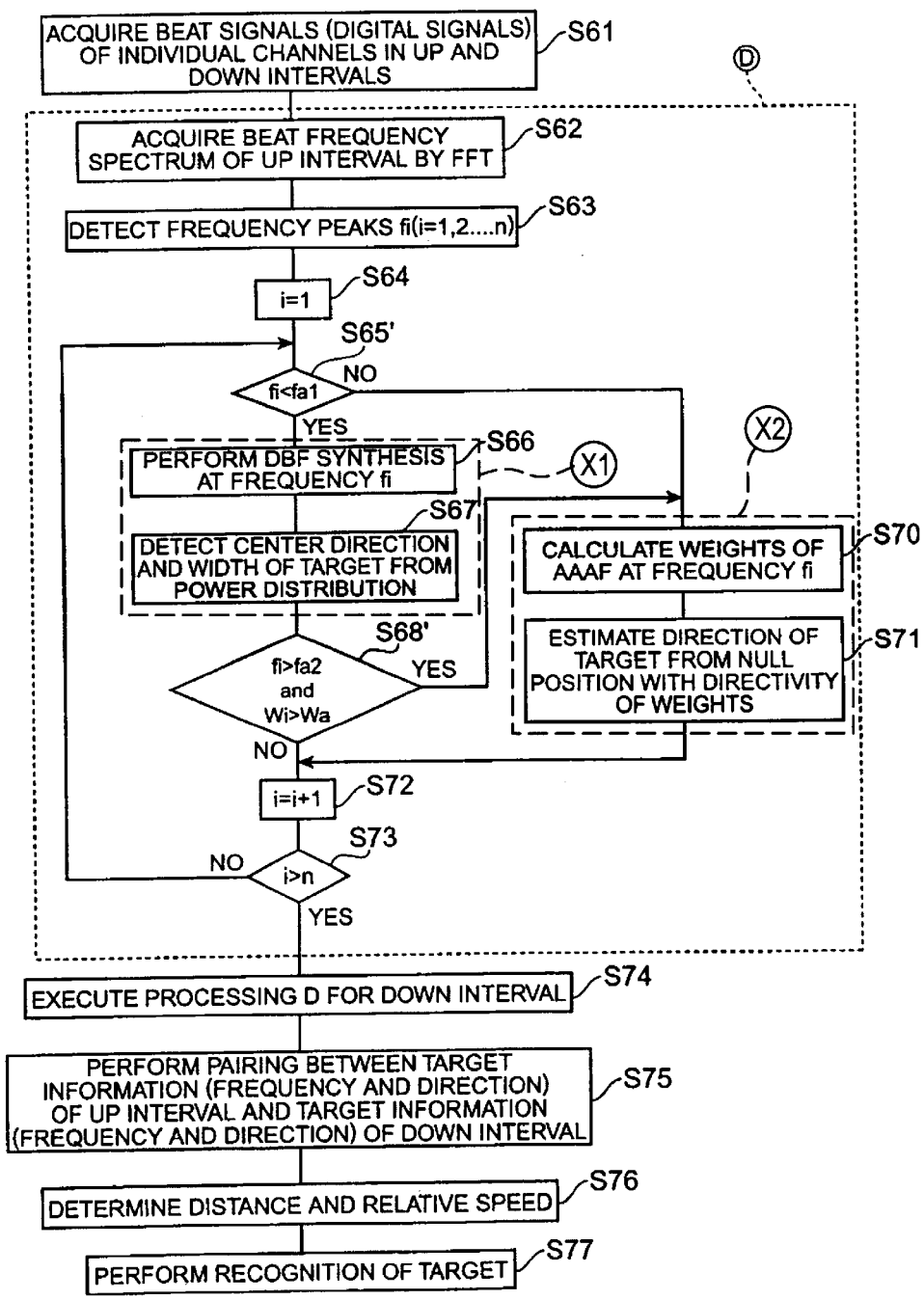
FIG. 11 is a flowchart to show the fourth embodiment of the present invention.

Next, the fourth embodiment of the present invention will be described with the flowchart of FIG. 11. The present embodiment is a modification of the third embodiment. The flowchart of FIG. 11 is almost the same as the flowchart of FIG. 10, but is different therefrom only in that the determination steps S65 and 68 are replaced by determination steps S65' and 68', respectively.

The third embodiment was the example of the radar apparatus constructed to use the first bearing detecting means for near targets and the second bearing detecting means for far targets and to again perform the bearing detection using the second bearing detecting means if the width of the near target obtained by the first bearing detecting means was not less than the predetermined width.

On the other hand, the apparatus of the present embodiment limits the target to be subjected to the repeated bearing detection by the second bearing detecting means not only by the width thereof but also by a distance specified by a new threshold.

Namely, the present embodiment is similar to the third embodiment in that whether a target is a near target or a far target is determined by use of the first threshold of frequency fa1 and in that the bearing detection is carried out using the first bearing detecting means for near targets and the second bearing detecting means for far targets.

However, the repeated bearing detection by the second bearing detecting means is carried out only if the width of the near target obtained by the first bearing detecting means is not less than the predetermined width and if the target is located farther than the distance corresponding to the frequency fa2 of the second threshold smaller than the frequency fa1.

Figure 12:
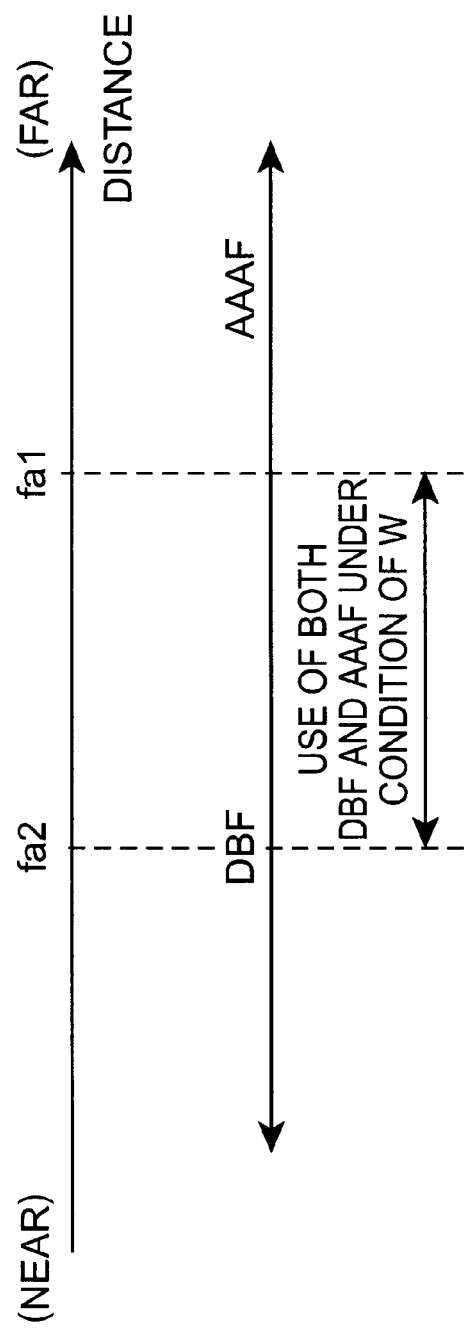
FIG. 12 is a diagram to show the relation between the applied bearing detecting means and the target distance in the fourth embodiment.

FIG. 12 is a diagram to show the relation between the applied bearing detecting means and the target distance. The second bearing detecting means by AAAF is applied to the target in the far range greater than the distance corresponding to the frequency fa1, the first bearing detecting means by DBF to the target nearer than the distance corresponding to the frequency fa2, and both the first bearing detecting means by DBF and the second bearing detecting means by AAAF are applied to the target existing between the frequencies fa1 and fa2, provided that the width W is larger than the predetermined value Wa.

As for the target near the pole, it is rare to detect a fused state of two or more targets by the bearing detection of target by the first bearing detecting means. There is thus no need for the repeated bearing detection by the second bearing detecting means in that region, so that elimination of this process can reduce the operational load.

Figure 13:
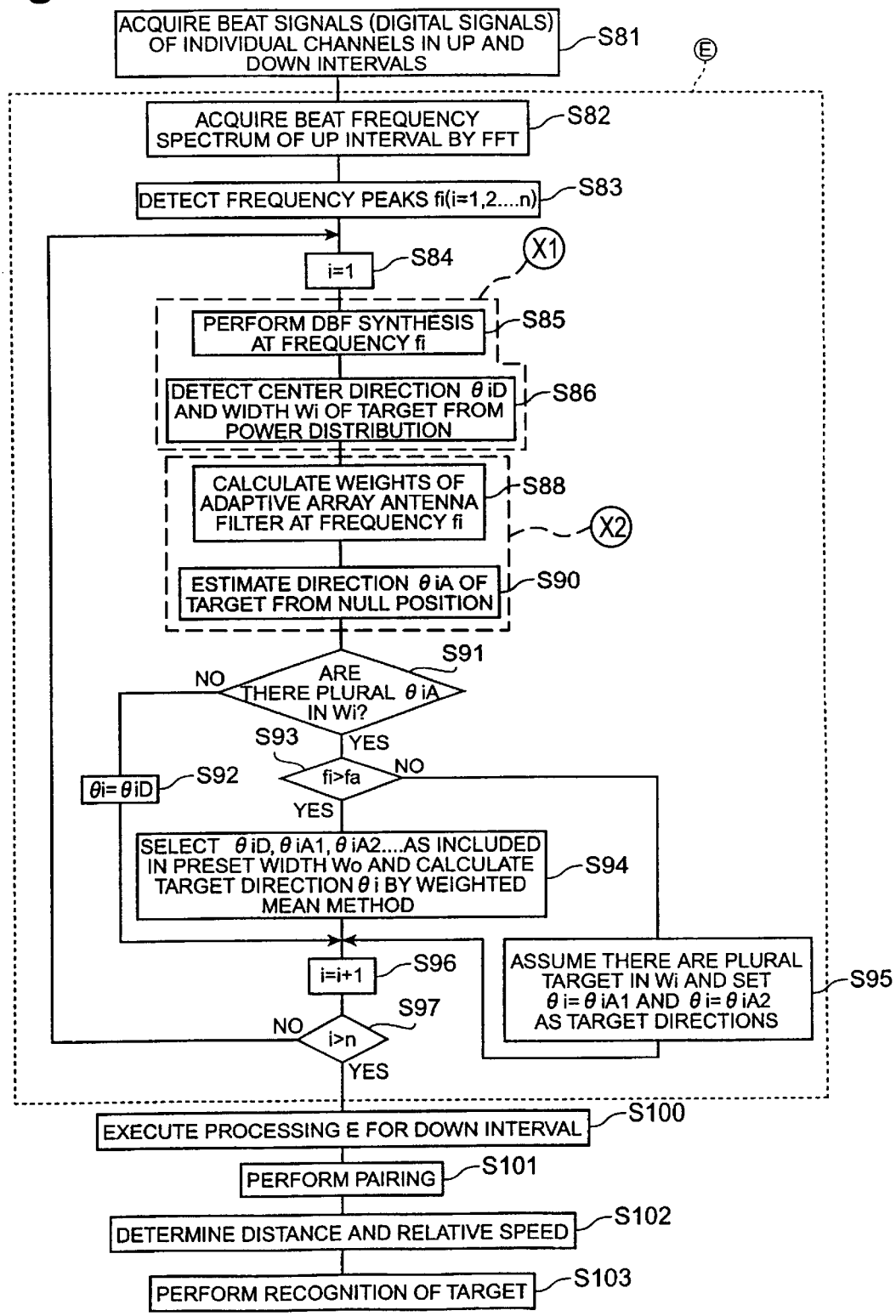
FIG. 13 is a flowchart to show the fifth embodiment of the present invention.

Next, the fifth embodiment of the present invention will be described with the flowchart of FIG. 13. In the embodiments heretofore, the bearing detection by the second bearing detecting means is carried out only when necessary, because the computational load of the second bearing detecting means is large.

In contrast with it, the present embodiment provides an example of the apparatus constructed to carry out both the first bearing detecting means and the second bearing detecting means for all targets in the detection range on the presumption that the computational time leaves some margin. The present embodiment can further enhance the detection accuracy by combination of target directions acquired by the two means.

Step S81 to step S83 are the same as step S11 to step S13 of the first embodiment. Step S100 to step S103 are the same as step S24 to step S27 of the first embodiment. Then steps S85 and 86 constitute the first bearing detecting means X1 and steps S88 and 90 the second bearing detecting means X2.

The feature of the present embodiment is step S91 to step S95. Step S91 is a step of determining whether there exist a plurality of target directions θiA detected by the second bearing detecting means X2 among the target widths Wi detected by the first bearing detecting means X1.

Figure 14:
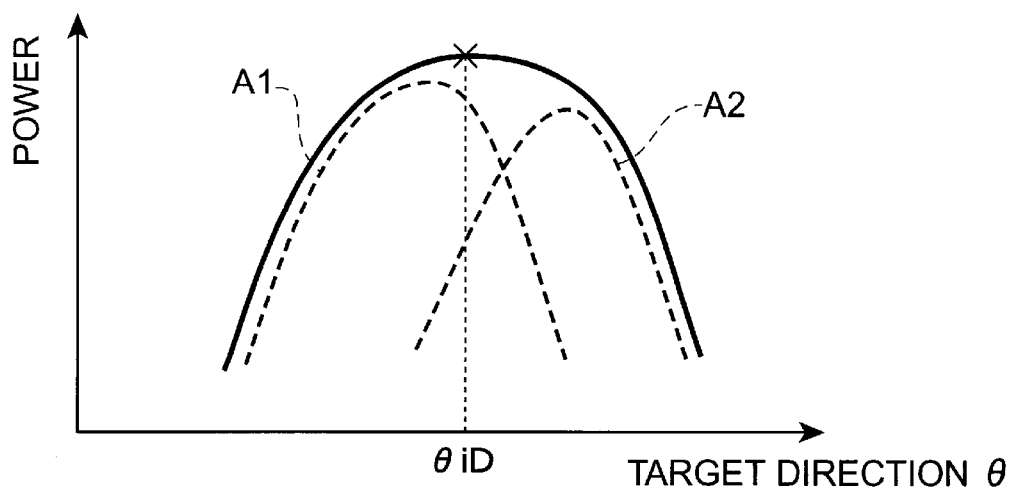
FIG. 14 is a graph to show a power distribution obtained by the first bearing detecting means.
Figure 15:
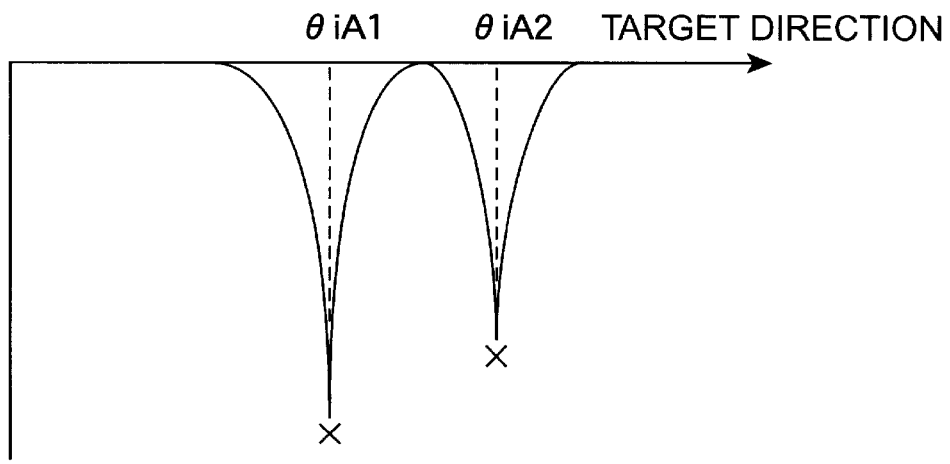
FIG. 15 is a graph to show a power distribution obtained by the second bearing detecting means.

If there is only one target direction, the flow transfers to step S92 to set the target direction θiD detected by the first bearing detecting means X1, to the target direction θi. If there are plural directions, the flow transfers to step S93 to determine whether the target is either a near target or a far target. If the target is a far target, the flow proceeds to step S95 to simply estimate that there are plural targets in the width Wi and set θiA1, θiA2, . . . as target directions. FIG. 14 and FIG. 15 show the results of the detection where the bearing detection was carried out for targets A1 and A2 by the first bearing detecting means X1 and by the second bearing detecting means X2, respectively. Only one direction θiD is detected by the first bearing detecting means because of the fusion, but two target directions θiA1 and θiA2 are detected by the second bearing detecting means.

In the case of a near target, θiD, θiA1, θiA2, . . . , as included in the reference width Wo (corresponding to the car width in the example of the on-vehicle FM-CW radar apparatus), are selected from all the direction data detected for that target by the first and second bearing detecting means and the target direction θi is determined by the weighted mean method.

The present embodiment enables the fine target detection process as described and thus can reduce detection errors.

Figure 16:
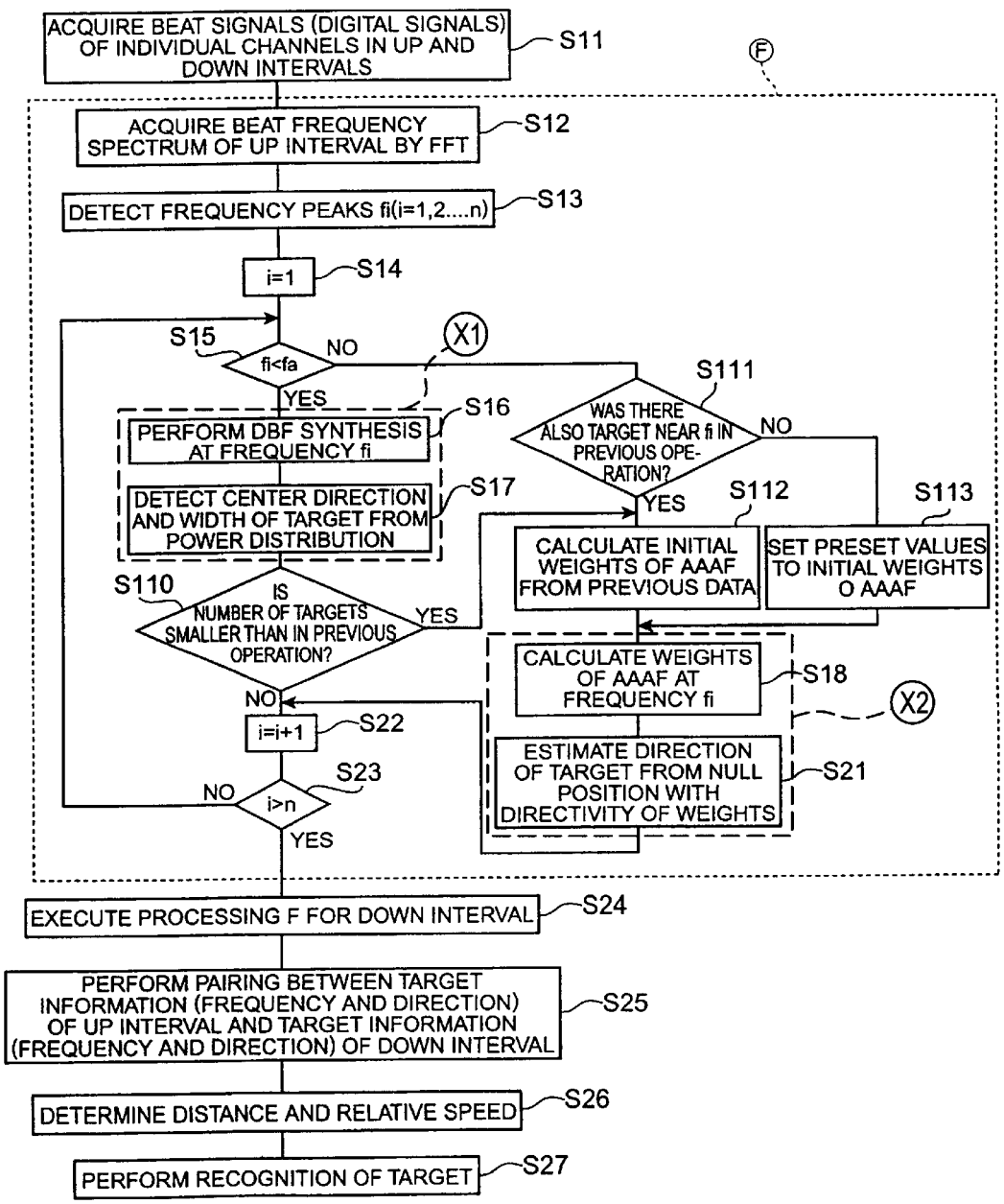
FIG. 16 is a flowchart to show the sixth embodiment of the present invention.

Next, the sixth embodiment will be described with the flowchart of FIG. 16. Since the present embodiment is a modification of the first embodiment (the flowchart of FIG. 4), the same steps are denoted by the same reference symbols.

In the present embodiment, the operational time is reduced by making use of the result of the previous operation, i.e., the result before one operation cycle for the initial weights W1(0), W2(0), . . . , Wn−1(0) of AAAF.

Step S112 is a step of calculating desired initial weights of AAAF from the previous data. For example, where there are k (k<n: n is the number of antenna elements) target directions known from the previous data and the directions are θi (i=1, 2, . . . , k), quick convergence can be achieved by setting the initial values W1(0), W2(0), . . . , Wn−1(0) as follows.

$$[W_1(0), W_2(0), \ldots, W_k]^T = [a]^{-1} \times [-1, -1, \ldots, -1]^{T,T};$$

transposed matrix, $^{-1}$; inverse matrix $$[a] = [A_1(\theta_1), A_2(\theta_1), \ldots, A_k(\theta_1)$$
$$A_1(\theta_2), A_2(\theta_2), \ldots, A_k(\theta_2)$$
$$\ldots$$
$$A_1(\theta_k), A_2(\theta_k), \ldots, A_k(\theta_k)]$$

$$W_{k+1}(0) = W_{k+2}(0) = \cdots = W_{n-1}(0) = 0$$

If the target extraction for the far range was carried out near the frequency fi in the previous operation (step S111), the final values of the repetitive computation result of the weights may be stored and set as they are.

Figure 17:
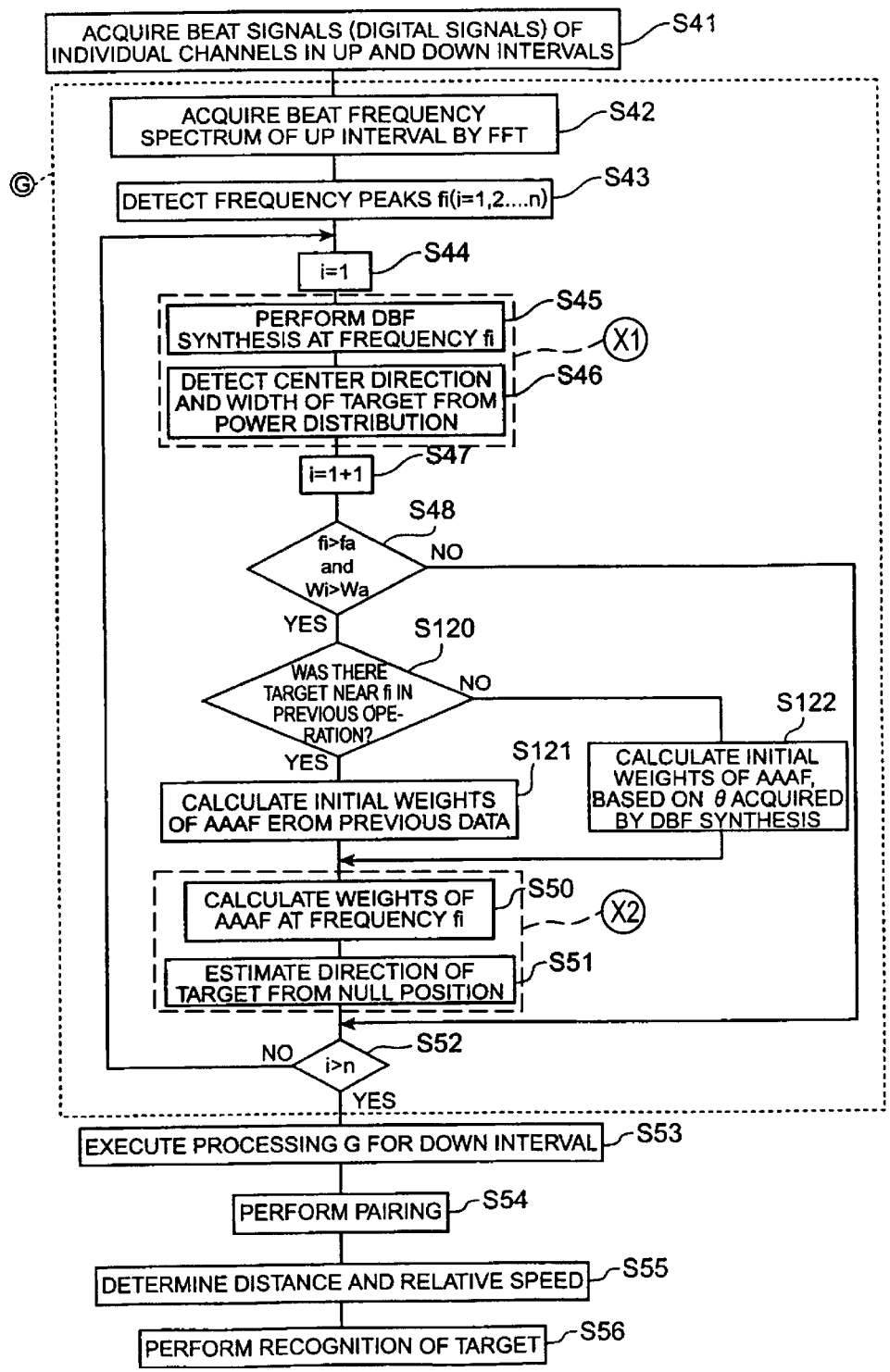
FIG. 17 is a flowchart to show the seventh embodiment of the present invention.

Next, the seventh embodiment will be described with the flowchart of FIG. 17. Since the present embodiment is a modification of the second embodiment, the same steps are denoted by the same reference symbols.

The feature of the second embodiment is that the second bearing detecting means X2 is applied to a target in the far range and over the predetermined width to accurately determine directions of targets considered to be fused. The present embodiment includes a further feature that different initial weight setting methods in the bearing detection by the AAAF of the second bearing detecting means X2 are applied depending upon whether there existed a target near the frequency fa in the result of the previous operation.

When there existed a target near the frequency fa in the result of the previous operation, the initial setting method described in the sixth embodiment is applied (step S121). If there existed no such target, the initial weights are not set based on the direction θ in the previous operation result, but are set based on the direction e obtained from the result of the first bearing detecting means X1.

The operational process with the AAAF was employed as the second bearing detecting means, but the MUSIC method may also be applied instead thereof. The MUSIC method is described, for example, in the document "Multiple Emitter Location and Signal Parameter Estimation: IEEE TRANSACTIONS ON ANTENNAS AND PROPAGATION, Vol. AP-31, No. 3, MARCH 1986."

As described above, the FM-CW radar apparatus of the present invention comprises the first bearing detecting means X1 for detecting the bearing of the target by carrying out the formation and scanning of the antenna beam based on the DBF process over the beat signals obtained through the plurality of antenna elements and the second bearing detecting means X2 for detecting the bearing of the target as point information by analyzing the phase difference between the beat signals obtained through the plurality of antenna elements and is constructed to detect the target bearing by properly selecting either one or both of the detecting means, so as to be able to reduce detection errors.

Figure 18:
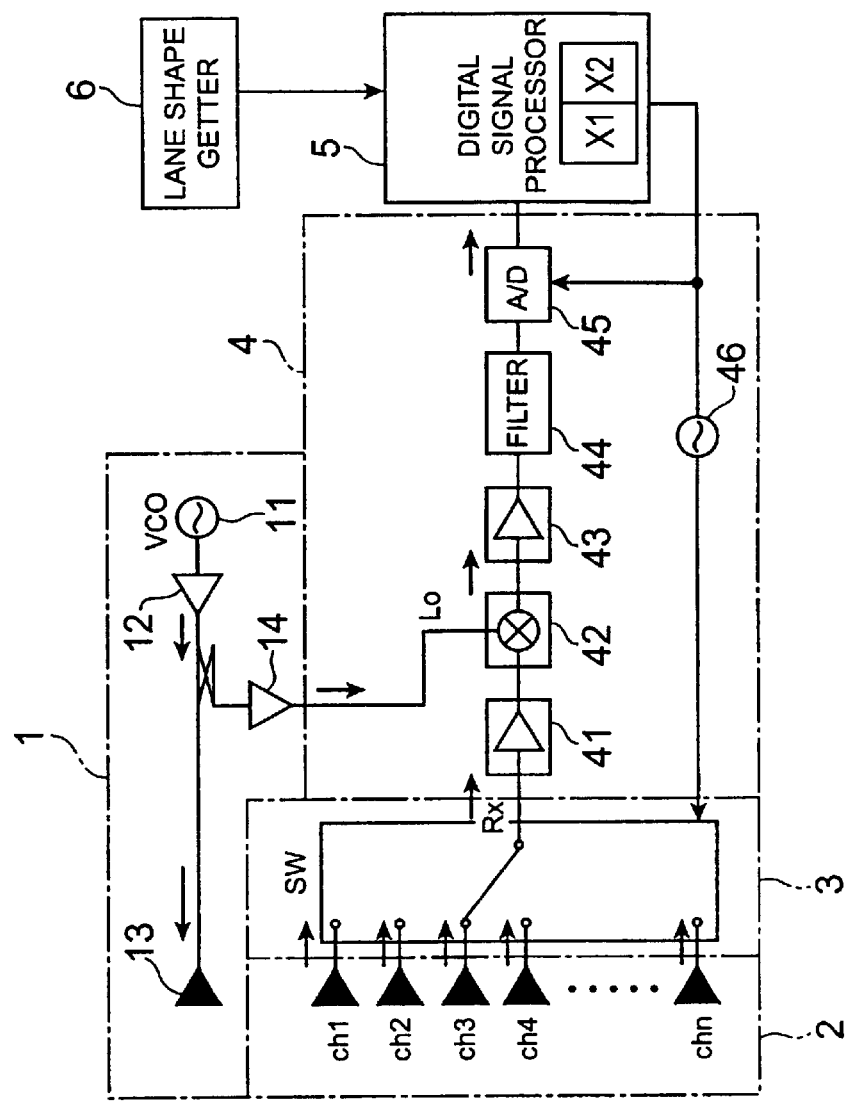
FIG. 18 is a block diagram to show a radar apparatus as the eighth embodiment of the present invention.

FIG. 18 is a block diagram to show a radar apparatus as the eighth embodiment of the present invention. Just like the radar apparatus of FIG. 1, this radar apparatus is an FM-CW radar apparatus using the transmitted signal of frequency-modulated (FM) continuous wave (CW). The apparatus is also a DBF radar apparatus that carries out the formation and scanning of the antenna beam by the digital beamforming technology for detecting the target direction. Like or equivalent elements to those in FIG. 1 are denoted by the same reference symbols.

In general, the DBF synthesis process imposes a large operational load. It is thus contemplated that the DBF synthesis is carried out at the limited number of beat frequencies corresponding to distances with high possibilities of existence of target (Japanese Patent Application Laid-Open No. H11-133142) in order to lower the operational load.

An example of methods for detecting beat frequencies corresponding to distances with high possibilities of existence of target is a method of rdetecting a frequency of a peak (peak frequency) from the beat frequency spectrum before the DBF synthesis process.

However, the peak level in the beat frequency spectrum before the DBF synthesis process becomes lower as the distance to the target increases, or as the value of the beat frequency increases. Therefore, it is possible to fail to detect a peak frequency for a far target. The present embodiment was accomplished for solving this problem.

The FM-CW radar apparatus being the eighth embodiment of the present invention illustrated in FIG. 18 uses an array antenna having a plurality of antenna elements as the receiving antenna and can form an antenna beam in any desired bearing by carrying out the appropriate phase shift process over the received signals through the respective antenna elements and the synthesis process. Then the beam scan is achieved by successively shifting the desired bearing. The phase shift process and synthesis process of the element-by-element received signals are carried out by digital operations. Namely, the formation and scanning of the antenna beam is carried out using the digital beamforming (DBF) technology. The DBF technology is well-known and is disclosed, for example, in Japanese Patent Application Laid-Open No. H11-133142.

In the ordinary radar systems to which the DBF technology is applied, the high-frequency analog devices such as the RF amplifier for amplifying the received signal, the mixer for mixing the received signal with the transmitted signal to gain the beat signal, etc. are provided for each of the antenna elements, but the radar apparatus of the present embodiment is constructed of a set of such devices for the whole radar apparatus by making use of a high-speed changeover switch.

This radar apparatus is provided with the transmitter section 1, the array antenna 2, the changeover switch 3, the receiver section 4, and the digital signal processing section 5. The apparatus is also provided with a lane shape acquiring means 6 as an additional component.

The transmitter section 1 is composed of the voltage-controlled oscillator (VCO) 11 having the center frequency of f0 (for example, 76 GHz), the buffer amplifier 12, the transmitting antenna 13, and the RF amplifier 14. The VCO 11 outputs a modulated wave (transmitted signal) of $f0 \pm \Delta F/2$ according to the control voltage supplied from the dc power supply for modulation not illustrated. The modulated wave is amplified by the buffer amplifier 12 and radiates as an electromagnetic wave from the transmitting antenna 13 to the wide range. Part of the transmitted signal is amplified by the RF amplifier 14 and the amplified signal is outputted as a local signal for detection of the received signals.

The reception array antenna 2 is provided with n antenna elements and the switch 3 is disposed behind the reception array antenna 2. The switch 3 has n input terminals and one output terminal, and each of the n antenna elements is connected to a corresponding input terminal. Namely, the first channel to the nth channel independent of each other in the respective antenna elements are formed between each antenna element and the switch 3.

The output terminal of the switch 3 is to be connected to either one of the n input terminals and the connection is changed over on a periodic basis by a changeover signal (clock signal). The changeover of connection is electrically conducted on circuitry.

The receiver section 4 is provided with the RF amplifier 41, the mixer 42, the amplifier 43, the filter 44, the A/D converter 45, and the changeover-signal oscillator 46. The RF amplifier 41 amplifies the output signal from the output terminal of the switch 3, i.e., a signal received through either antenna element of the array antenna 2, and the mixer 42 mixes it with part of the transmitted signal from the RF amplifier 14. This mixing results in downconverting the received signal to generate a beat signal, which is a difference signal between the transmitted signal and the received signal.

The parallel received signals in the respective channels are subjected to time division at times much shorter than the period of the beat signal by the switch 3 to be converted to serial signals. Therefore, the beat signals outputted from the mixer 42 are also serial beat signals of the respective channels. Each of the beat signals is put through the amplifier 43 and low-pass filter 44 into the A/D converter 45 to be converted to a digital signal at the timing of the output signal from the oscillator 46, i.e., at the timing of the clock signal for changeover of connection by the switch 3.

The digital signal processing section 5 accepts input of the digital beat signals from the A/D converter 45. The signal processing section 5 separates the serial digital beat signals on a channel-by-channel basis and temporarily stores the thus separated signals. Then the signal processing section carries out various processes over the channel-by-channel digital beat signals thus obtained, to acquire the target information, i.e., the distance, relative speed, bearing, and width of the target.

The distance and relative speed are acquired based on the aforementioned principle of detection by the FM-CW radar apparatus. The direction is acquired by the method of carrying out the forming and scanning of the antenna beam according to the DBF synthesis technology.

The lane shape acquiring means 6 is additionally mounted on the FM-CW radar apparatus. When the apparatus is mounted on a vehicle, the lane shape acquiring means 6 acquires the shape of the lane on which the vehicle is running. For example, the curvature of the running lane can be determined from the speed and yaw rate from a speed sensor and a yaw rate sensor mounted on the vehicle. Once the curvature of the running lane is determined, the lane shape can be found under the assumption that the lane width is a predetermined value.

Figure 19:
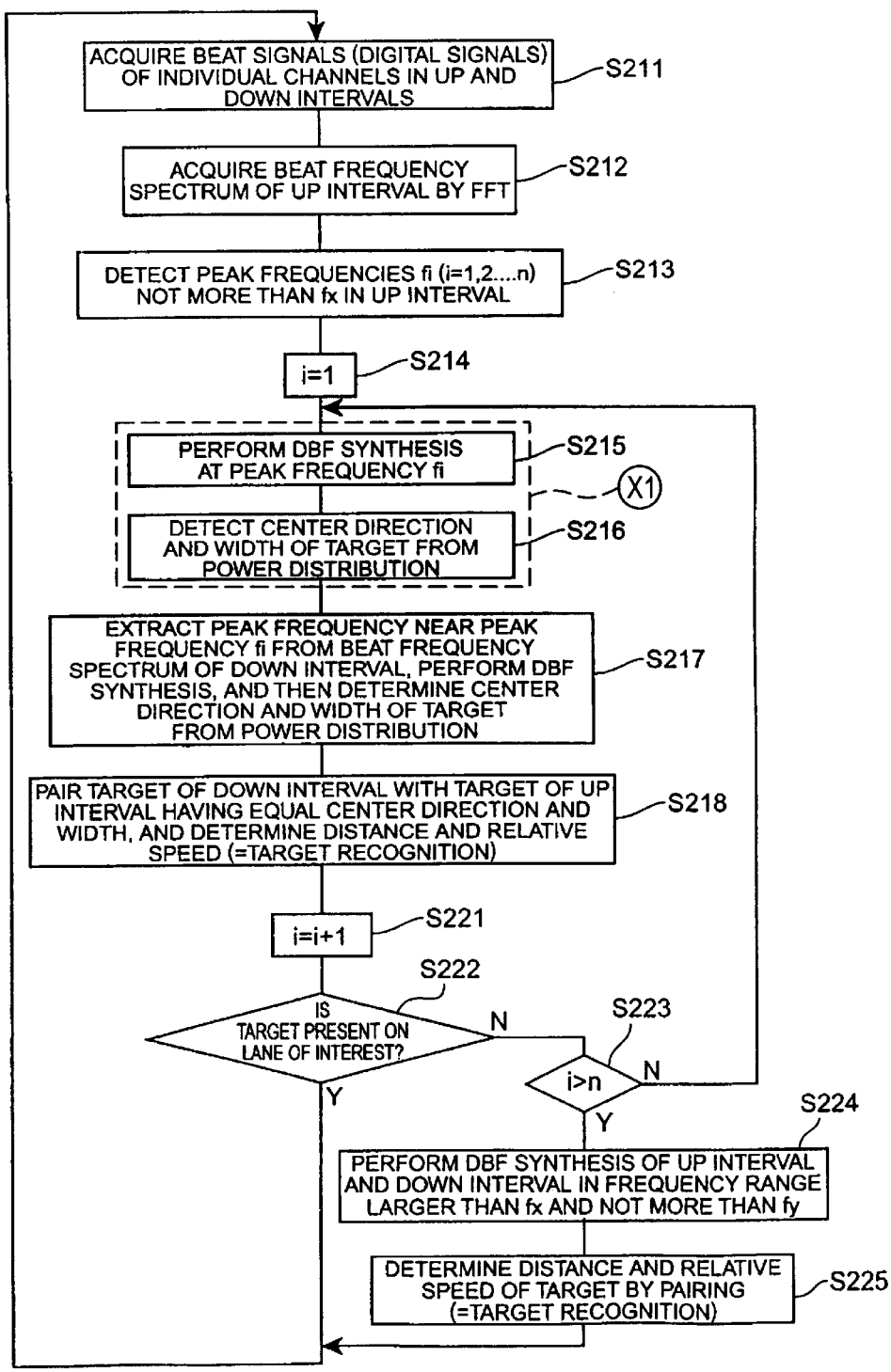
FIG. 19 is a flowchart to show the eighth embodiment of the present invention.

Next, the processing procedures in the digital signal processing section 5 will be described with the flowchart of FIG. 19.

First, step S211 is a step of separating the digital beat signals supplied from the A/D converter 45 and storing them on a channel-by-channel basis. At this time, the digital beat signals are stored for both of the up intervals in which the frequency of the transmitted signal increases and the down intervals in which the frequency decreases.

Step S212 is a step of carrying out the fast Fourier transform process (FFT process) over the digital beat signals of the up interval for one appropriate channel or for two or more appropriate channels. Through this step, the beat frequency spectrum of the up interval is gained.

Figure 20:
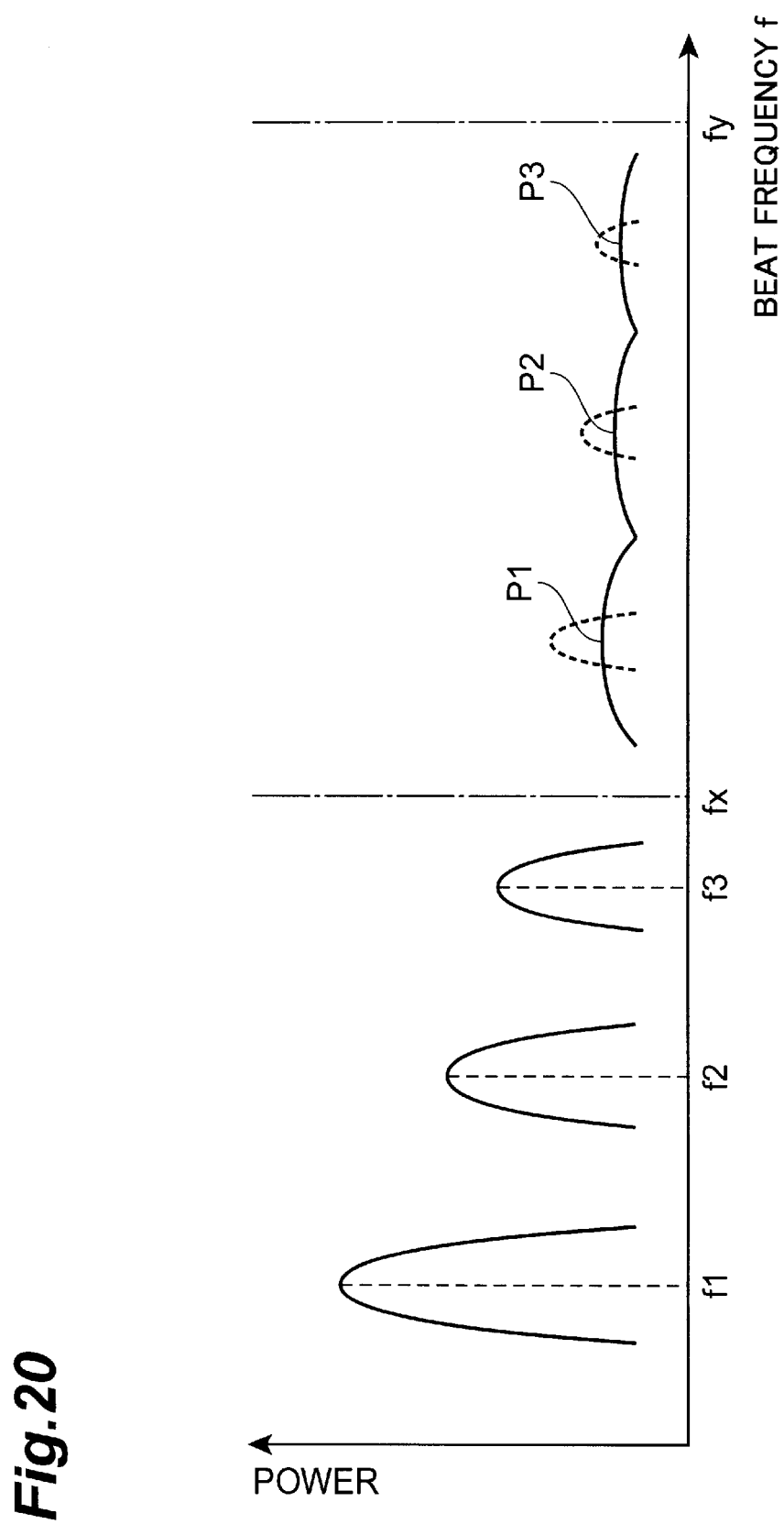
FIG. 20 is a graph to show an example of a beat frequency spectrum in an up interval.

FIG. 20 shows an example of the beat frequency spectrum acquired, by solid lines. As seen from this figure, with increase in the beat frequency, power levels of peak frequencies resulting from targets become lower, it becomes more difficult to discriminate peaks from noise, and the peaks lose their sharpness. In the same figure, fx and fy are preset values, fx indicating an upper limit of the beat frequency considered to be a detection limit of peak without error and fy indicating a beat frequency corresponding to the distance of the most distant target to be detected. It is noted that fx and fy do not have to be set to fixed values but can be set as variable values according to the circumstances.

Step S213 is a step of carrying out the peak search in the frequency range of not more than fx for the beat frequency spectrum obtained in step S212 to detect peak frequencies fi (i=1, 2, . . . , n). Here the peak frequencies fi are beat frequencies corresponding to peaks in the beat frequency spectrum. The peak frequencies fi are accompanied by the suffix i=1, 2, . . . , n in the ascending order from the smallest beat frequency to the largest beat frequency. Therefore, the peak frequency fn is the maximum peak frequency not more than fx.

The peak search in this step S213 may be carried out for an appropriate channel or for a plurality of channels. When it is carried out for plural channels, frequencies detected in either one channel are employed as frequencies to be subjected to the synthesis in next step S215. For example, when the frequencies f1, f2, f3 are detected in the channel ch1 and the frequencies f1, f2, f4 in the channel ch2, fi=f1, f2, f3, and f4.

This prevents a frequency to be subjected to the synthesis in step S215 from being missed even if a reflected wave is not detected in the range of detection dispersion and in a single channel by accident but can be detected in another channel, because of small received power of the reflected wave from the far range or the like and because of the proximity to the threshold of frequency detection.

As understood from the above description, step S212 and step S213 constitute the peak frequency detecting means for detecting the frequencies of peaks from the beat frequency spectrum before the DBF synthesis process.

Since the beat frequency spectrum of the up interval is acquired in step S212, the peak frequencies fi are equivalent to fb1 (=fr−fd) in above Eq. (1). If the beat frequency spectrum of the down interval is acquired instead of the up interval, the peak frequencies fi are equivalent to fb2 (=fr+fd) in above Eq. (2).

When the present FM-CW radar apparatus is used for on-vehicle use, that is, when the apparatus is mounted on a vehicle to be used for the detection of a preceding car, the beat frequency fr is normally sufficiently larger than the Doppler frequency fd and thus each of the peak frequencies fi can be said to be approximately proportional to the distance at which the target exists.

Step S214 to step S225 constitute the target detecting means. Step S214 is a step of setting i=1 for the suffix i of the peak frequency fi. The value of the suffix i is given an increment of 1 in step S221 and thereafter it is determined in step S223 whether the value of "i" is larger than "n." As already described, "n" is the suffix attached to the largest frequency out of the peak frequencies fi not more than fx detected in step S213.

Through these steps S214, 221, 223, the target detecting process by steps S215 to step S218 is executed for 1 to n of "i." However, if the condition for suspension in step S222 described hereinafter is met midway, the target detecting process by step S215 to step S218 is suspended before i reaches n.

Figure 21:
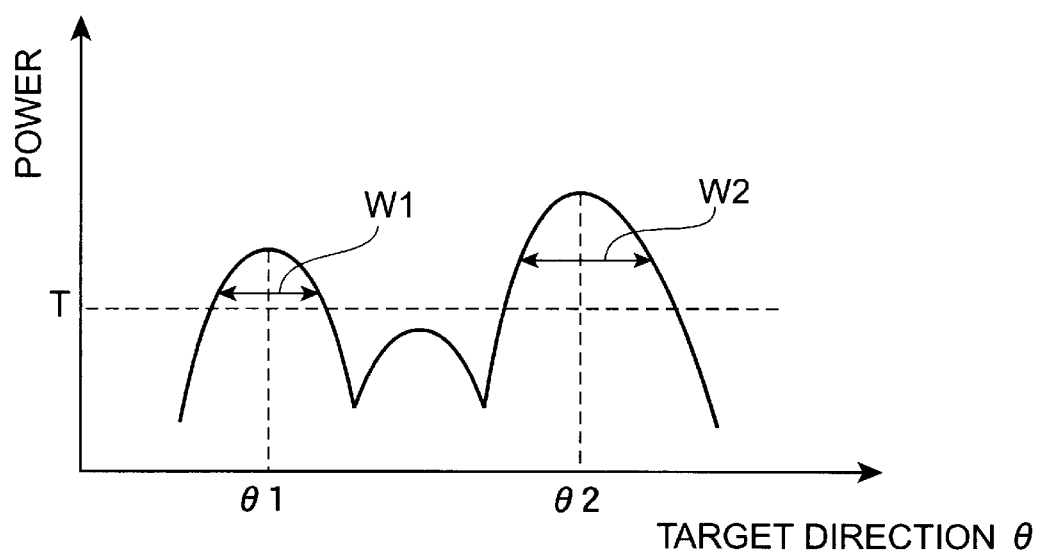
FIG. 21 is a graph to show a power distribution after the DBF synthesis process.

Step S215 is a step of carrying out the DBF synthesis at the peak frequency fi to acquire a power distribution with the variable of target direction θ. As described hereinafter, the DBF synthesis is carried out for the far targets throughout the entire frequency range corresponding to the distance range to be searched, but the DBF synthesis herein is carried out with being limited to the peak frequencies fi, because it is already clear that the targets are in the near range nearer than the distance corresponding to the beat frequency fx and that approximate distances thereof, i.e., distances including an error due to the relative speed are already known by the peak frequencies fi. FIG. 21 is a graph to show an example of the power distribution with the variable of target direction θ at the peak frequency fi (for example, at the frequency peak f1).

Step S216 is a step of determining the center direction θ and width W of each target from the power distribution obtained in step S215.

The center direction θ of each target is determined from a direction indicating a peak over a threshold in the power distribution. For example, in the example of FIG. 21, there appear two peaks at the positions of the direction θ1 and the direction θ2 in the range over the threshold T. The peaks not more than the threshold T are handled as noise. It is seen from this figure that two targets exist in the direction θ1 and in the direction θ2, respectively, and at the approximate distance corresponding to the peak frequency fi.

The width W of each target is determined from a width at the position where the power is lowered by a predetermined amount from the peak position. In the example of FIG. 21, the width of the target in the direction θ1 is W1 and the width of the target in the direction θ2 is W2.

Step S217 is a step of carrying out the DBF synthesis process for a frequency range near the beat frequency fi, including the peak frequency fi, with use of the beat signal of the down interval to obtain a power distribution with the variable of the target direction for the frequency range. Then the center direction and width of the target are detected from the power distribution.

Next, step S218 is a step of searching for target information of almost the same direction and width as the target information of the up interval acquired in step S216 out of the target information of the down interval acquired in step S217 and pairing them. The reason is that target information pieces of beat frequencies, directions, and widths approximately equal to each other can be regarded as information resulting from a common target.

Accurate distance and relative speed of the target can be obtained by applying above Eq. (5) and Eq. (6) to this paired target information. The above provides all the information concerning the distance, relative speed, direction, and width of the target, whereby the target has been recognized virtually.

After completion of step S218, the flow transfers via step S221 to step S222. Step S222 is a step of determining whether the target recognized at the end of step S218 is present on the lane acquired by the lane shape acquiring means 6.

Figure 22:
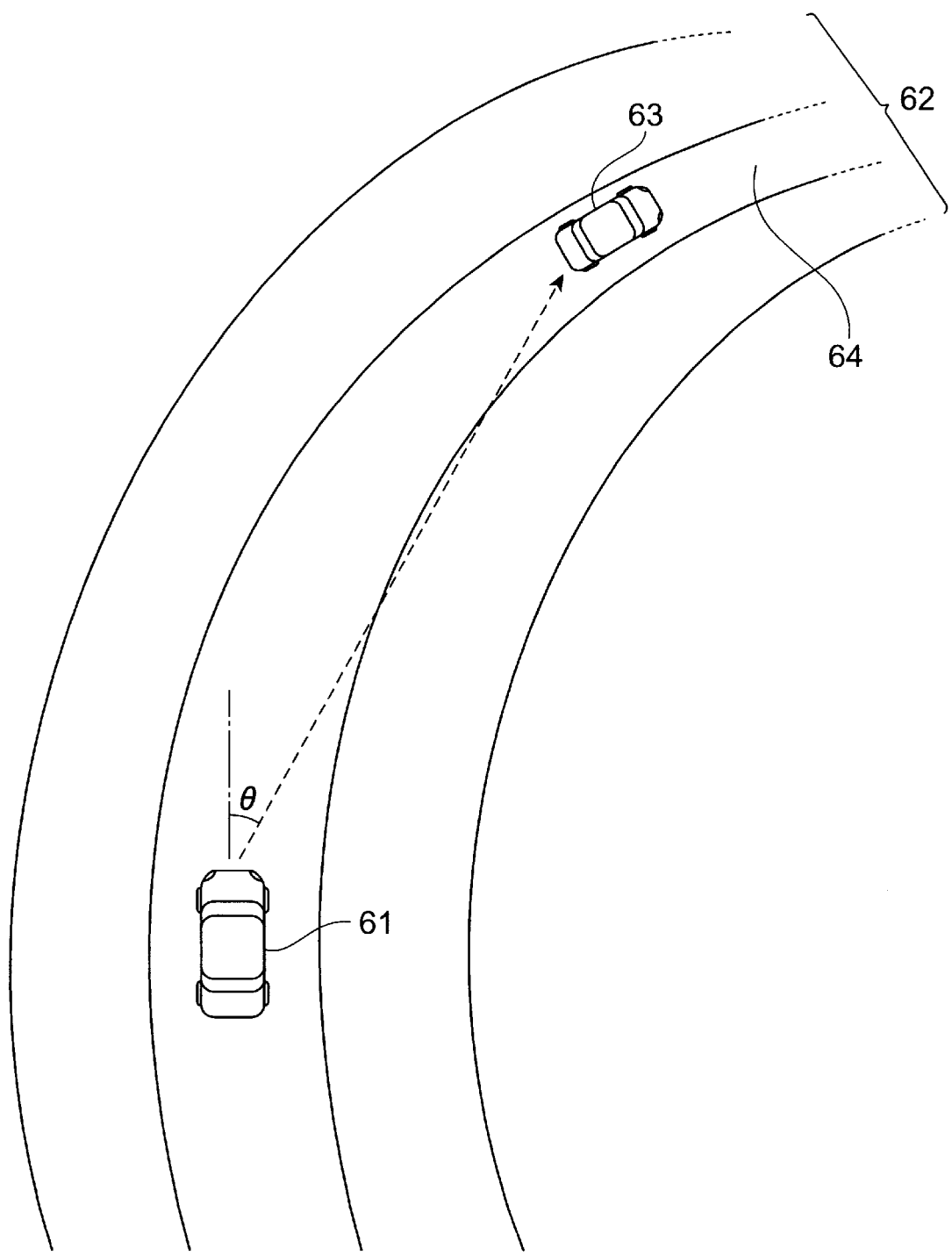
FIG. 22 is a plan view to show an example of a running state of an automobile equipped with the radar apparatus of the present embodiment.

FIG. 22 is a schematic plan view to show an example of a running state of a car equipped with the present FM-CW radar apparatus. In this example, the car 61 equipped with the present FM-CW radar apparatus is running on a center lane 64 of a three-lane-structure road 62. The road 62 is greatly right curved and another car 63 is running ahead of the car 61 on the center lane 64. In this state, it is not always necessary to know the behavior of a car running further ahead of the car 63.

When there exists a preceding vehicle on the same lane as in this example, step S222 ends in yes to suspend the target recognition by step S215 to step S218 executed repeatedly. After that, the flow returns step S211 to acquire a new beat signal.

The shape of the running lane, i.e., the center lane 64 herein is acquired by the lane shape acquiring means 6, as stated previously.

If the target recognized in step S218 is not running on the lane of interest, the flow transfers to step S223 to repeat the target recognition by step S215 to step S218 before a target is recognized for the peak frequency fn.

After completion of the target recognition for the peak frequencies fn, the flow transfers from step S223 to step S224. Step S224 is a step of carrying out the DBF synthesis process for the up interval and down interval in the beat frequency range greater than the beat frequency fx and not more than the beat frequency fy. When the antenna beam is formed in a direction in which a target exists, a peak originating in a target appears in a frequency range in which no definite peak appeared before the DBF synthesis process, for example, like the peaks P1 to P3 of FIG. 20.

Step S225 is a step of comparing the target information of the up interval with the target information of the down interval, pairing information pieces with directions and widths equal to each other and with beat frequencies close to each other, and detecting the accurate distance and relative speed of the target, thereby recognizing the target.

After completion of step S225, the flow returns to step S211 to continue the target recognition in similar fashion, based on a new beat signal.

As described above, the FM-CW radar apparatus of the present invention readily detects the peaks of the beat frequency spectrum originating in the targets, because it performs the DBF synthesis process throughout the entire frequency range up to the maximum frequency of the detection range, for the beat frequencies greater than the predetermined frequency. In addition, since the apparatus is constructed to detect the peak frequency for each target in the relatively near range from the beat frequency spectrum before the DBF synthesis process and detect the distance and direction of the target by the DBF synthesis process at the frequency or at a frequency near it, the operational load is smaller than in the case of the DBF synthesis process being carried out throughout the entire frequency range.

Figure 23:
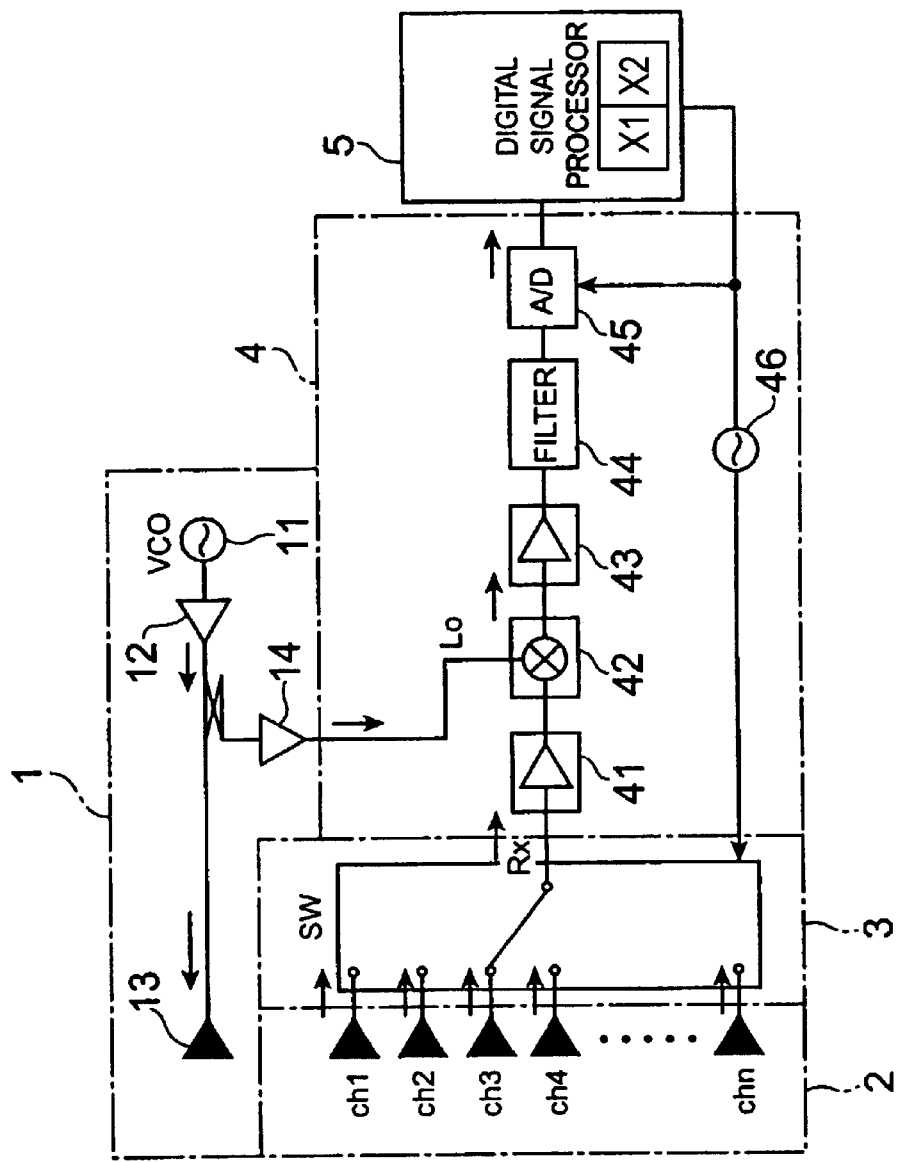
FIG. 23 is a block diagram to show a radar apparatus as the ninth embodiment of the present invention.

FIG. 23 is a block diagram to show a radar apparatus being the ninth embodiment of the present invention and the structure of the apparatus is substantially the same as the first radar apparatus.

An example of the DBF radar apparatus is, for example, one described in Japanese Patent Application Laid-Open No. H11-160423. The DBF radar apparatus described in this application performs the scanning at intervals of a preset scan pitch angle.

The scan pitch angle of the DBF radar apparatus is properly determined according to the purpose of application of the radar apparatus. Supposing that the DBF radar apparatus is used as a device for detecting a preceding car, for example, if the scan pitch angle is 0.50° and the antenna beam is successively formed in 41 directions, the beam will scan the angular range of approximately 20°.

The scan pitch angle corresponds to the scan angle resolution; thus, the scan angle resolution becomes higher as the scan pitch angle becomes smaller; whereas the scan angle resolution becomes lower as the scan pitch angle becomes larger.

Incidentally, when the scan pitch angle is preliminarily determined and the scan angle resolution is constant, the length resolution in the scanning direction varies according to the distance to the target. For example, the angle subtended by a target of width A decreases as the distance to the target increases. For that reason, if the scan angle resolution is constant, the length resolution in the width direction of the target becomes lower as the distance to the target becomes farther.

For that reason, if the scan angle resolution is determined on the basis of the near targets, the length resolution in the scanning direction will be insufficient for the far targets. On the other hand, if the scan angle resolution is determined on the basis of the far targets, the length resolution in the scanning direction will become higher than necessary for the near targets. The resolution higher than necessary is nothing but execution of the DBF synthesis process in too many directions and results in increase in the processing time.

The present embodiment has been accomplished in order to solve this problem.

Just like the radar apparatus of FIG. 1, the radar apparatus of the present embodiment is provided with the transmitter section 1, the array antenna 2, the changeover switch 3, the receiver section 4, and the digital signal processing section 5. Since the transmitter section 1 to the receiver section 4 are similar to those in the radar apparatus of FIG. 1, the redundant description is omitted herein.

The digital signal processing section 5 accepts input of digital beat signals from the A/D converter 45. Here serial digital beat signals are separated on a channel-by-channel basis and the signals thus separated are temporarily stored. Various processes are carried out over the channel-by-channel digital beat signals thus obtained to acquire the target information or the distance, relative speed, direction, and width of the target.

The distance and relative speed are acquired according to the aforementioned principle of detection by the FM-CW radar apparatus. The direction is acquired by the method of effecting the formation and scanning of the antenna beam based on the DBF synthesis technology.

Figure 24:
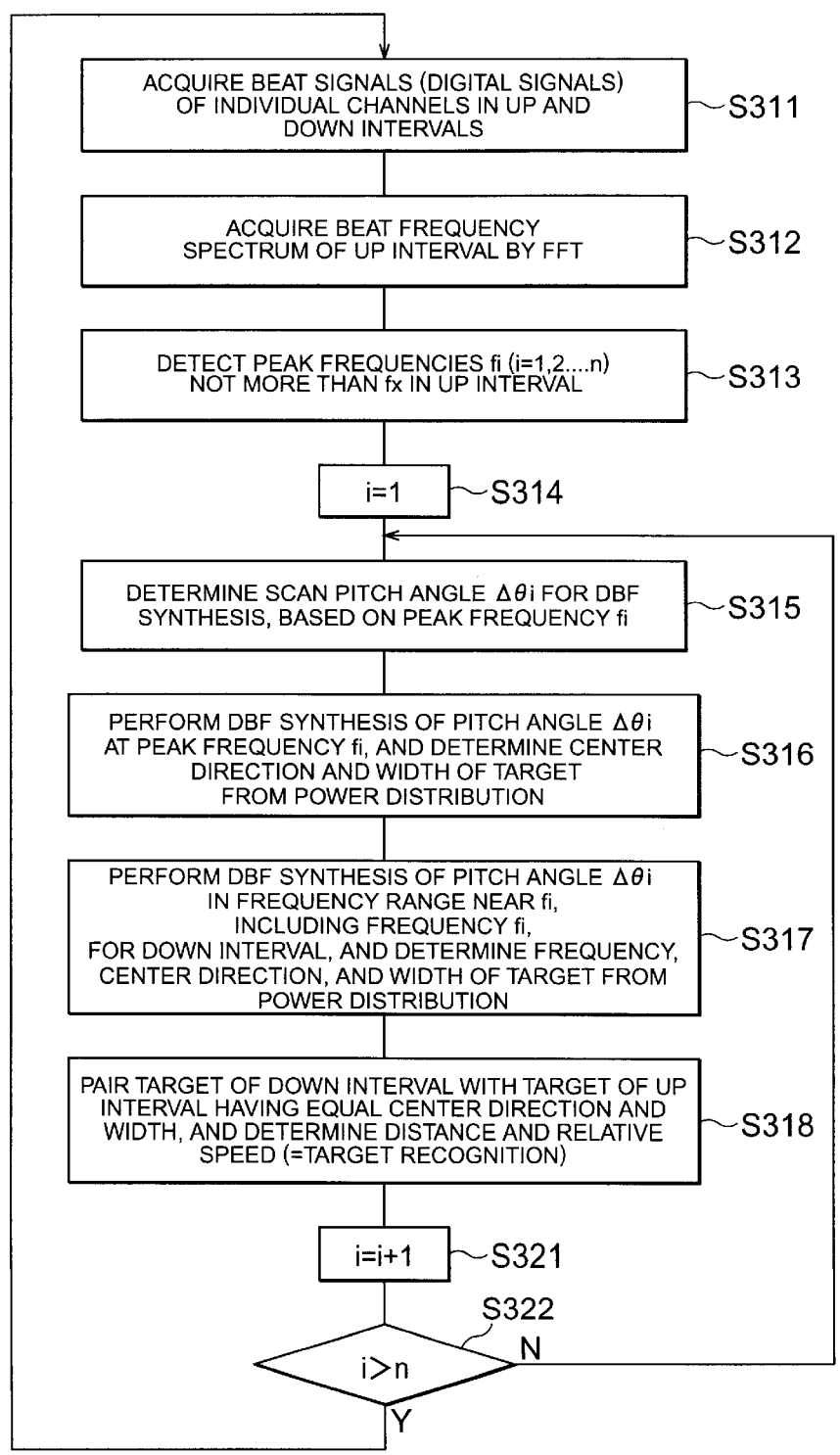
FIG. 24 is a flowchart to show the ninth embodiment of the present invention.

Next, the processing procedures in the digital signal processing section 5 will be described below with the flowchart of FIG. 24.

First, Step S311 is a step of separating the digital beat signals supplied from the A/D converter 45 into the respective channels and storing them. At this time, the digital beat signals are stored for both of the up intervals in which the frequency of the transmitted signal increases and the down intervals in which the frequency decreases.

Steps S312 and 313 constitute a means for acquiring information concerning an appropriate distance of a target assumed to exist, i.e., preliminary distance information, prior to the DBF synthesis process executed after step S314. Namely, the approximate distance of the target, i.e., the target distance including an error due to the magnitude of relative speed is preliminarily acquired before the DBF synthesis process, by making use of the distance detection principle of the FM-CW radar apparatus.

Step S312 is a step of carrying out the fast Fourier transform process (FFT process) over the digital beat signals of the up interval or the down interval for an appropriate channel or for two or more appropriate channels. This provides the beat frequency spectrum of either the up interval or the down interval. Let us suppose here that the beat frequency spectrum of the up interval is acquired.

Figure 25:
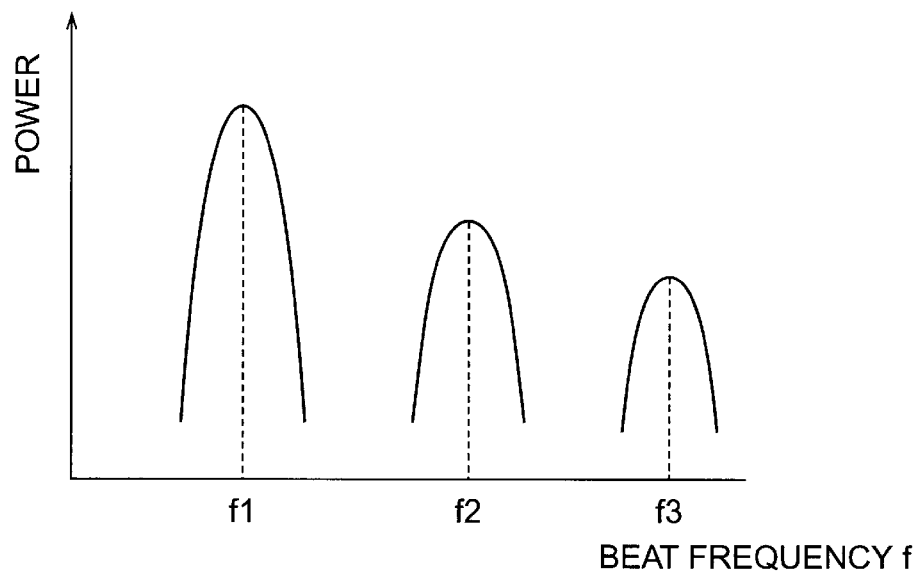
FIG. 25 is a graph to show an example of a beat frequency spectrum in an up interval.

FIG. 25 shows an example of the beat frequency spectrum acquired. In the same figure, the axis of abscissa indicates the beat frequency and the axis of ordinate the power of received signals.

Step S313 is a step of detecting peak frequencies fi (i=1, 2, . . . , n) by carrying out a peak search of the beat frequency spectrum gained in step S312. Here the peak frequencies fi are values of beat frequencies corresponding to the peaks of the beat frequency spectrum. In this example, the peak frequencies fi are accompanied by the suffix i=1, 2, . . . , n in the ascending order from the smallest beat frequency to the largest frequency.

The peak search in this step S313 may be carried out for an appropriate channel or for a plurality of channels. When the peak search is carried out for plural channels, all the frequencies detected in the respective channels are employed. For example, when the frequencies f1, f2 are detected in the channel ch1 and the frequencies f1, f3 are detected in the channel ch2, fi=f1, f2, and f3.

This prevents a frequency to be used for the synthesis in step S316 from being missed even under such circumstances that a reflected wave from a distant position has a small received power and is not detected in a single channel by accident in the range of detection dispersion because of proximity to the threshold of frequency detection, but it can be detected in another channel.

Since the beat frequency spectrum of the up interval is acquired in step S312, the frequency peaks fi are equivalent to fb1 (=fr−fd) in above Eq. (1). If the beat frequency spectrum of the down interval is acquired, the frequency peaks fi are equivalent to fb2 (=fr+fd) in above Eq. (2).

When the present DBF radar apparatus is used for on-vehicle use, that is, when it is mounted on a car to be utilized for detection of a preceding car, the beat frequency fr is generally sufficiently larger than the Doppler frequency fd and thus it can be said that each of the frequency peaks fi is approximately proportional to the distance at which the target exists.

Step S314 to step S322 constitute the target detecting means. Step S314 is a step of setting i=1 for the suffix i of the peak frequency fi. An increment of 1 is added to the value of the suffix i in step 321 and thereafter it is determined in step S322 whether the value of "i" is larger than "n." As described previously, "n" is the suffix attached to the largest peak frequency out of the peak frequencies fi detected in step S313.

Through these steps S314, 321, 322, the target detection process by step S315 to step S318 is carried out for 1 to n of "i."

Step S315 is a step of determining the scan pitch angle $\Delta\theta i$ for the DBF synthesis process executed hereinafter, based on the peak frequency fi. The scan pitch angle $\Delta\theta i$ is determined based on Eq. (7) below, which defines the relation with the peak frequency fi.

$$\Delta\theta i = \Delta\theta 0 / fi \quad (7)$$

($\Delta\theta 0$ is a constant)

According to this relation, the scan pitch angle $\Delta\theta i$ becomes smaller with distance of target.

Instead of this Eq. (7), the relation between the beat frequency fi and the scan pitch angle $\Delta\theta i$ may be preliminarily stored in the form of a map to indicate the relation as presented in Table 1.

TABLE 1

| Beat frequency fi (kHz) | 0 | 30 | 60 | 90 | 150 |
|---|---|---|---|---|---|
| Scan pitch angle $\Delta\theta$ (°) | 1.0 | 1.0 | 0.5 | 0.3 | 0.2 |

In use of this Table 1, if the beat frequency fi is between two specific points in Table 1, for example, if the beat frequency fi is 45 kHz, the scan pitch angle can be determined by linear interpolation.

Next, step S316 is a step of carrying out the DBF synthesis at the peak frequency fi, at intervals of the scan pitch angle $\Delta\theta i$ to acquire the power distribution with the variable of target direction $\theta$, and determining the center direction and width of each target from the power distribution.

Figure 26:
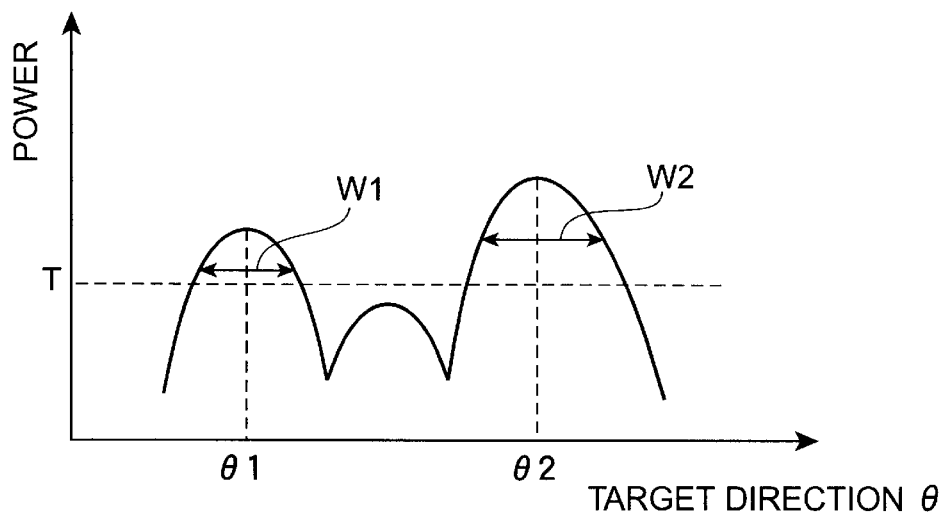
FIG. 26 is a graph to show a power distribution obtained by the first bearing detecting means.

FIG. 26 is a graph to show an example of the power distribution with the variable of target direction $\theta$ at the peak frequency fi (for example, at the frequency peak f1). The center direction $\theta$ and width W of each target are determined from this power distribution.

The center direction $\theta$ of a target is determined from a direction indicating a peak over the threshold in the power distribution. For example, in the example of FIG. 26, there appear two peaks at the positions of the direction $\theta 1$ and the direction $\theta 2$ in the range over the threshold T. Peaks not more than the threshold T are handled as noise. It is seen from this figure that there exist two targets in the direction $\theta 1$ and in the direction $\theta 2$, respectively, and at the approximate distance corresponding to the peak frequency fi.

The width W of the target is determined from the width at the position where the power is lowered by a predetermined amount from the peak position. In the example of FIG. 26, the width of the target in the direction $\theta 1$ is W1 and the width of the target in the direction $\theta 2$ is W2.

Step S317 is a step of carrying out the DBF synthesis process for a range near the beat frequency fi, including the peak frequency fi, by use of the beat signal of the down interval to obtain a power distribution with the variable of target direction in the frequency range. Then the center direction and width of each target are detected from the power distribution. The scan pitch angle $\Delta\theta i$ at this time is the one determined in step S315.

Next, step S318 is a step of searching for target information of the direction and width approximately identical to the target information of the up interval acquired in step S316 out of the target information of the down interval acquired in step S317 and pairing them. The reason is that the target information with the beat frequencies, directions, and widths approximately equal to each other can be regarded as the target information resulting from a common target.

The accurate distance and relative speed of each target can be determined by applying above Eq. (5) and Eq. (6) to the target information thus paired. The above provides the information concerning the distance, relative speed, direction, and width of the target, whereby the target has been recognized herein.

After completion of step S318, an increment is given to i in step S321 and thereafter it is determined in step S322 whether i is larger than n. If i is larger than n the flow returns to step S311 to acquire a next digital beat signal. If smaller, the flow returns to step S315 to perform the DBF synthesis process at the next beat frequency fi.

Figure 27:
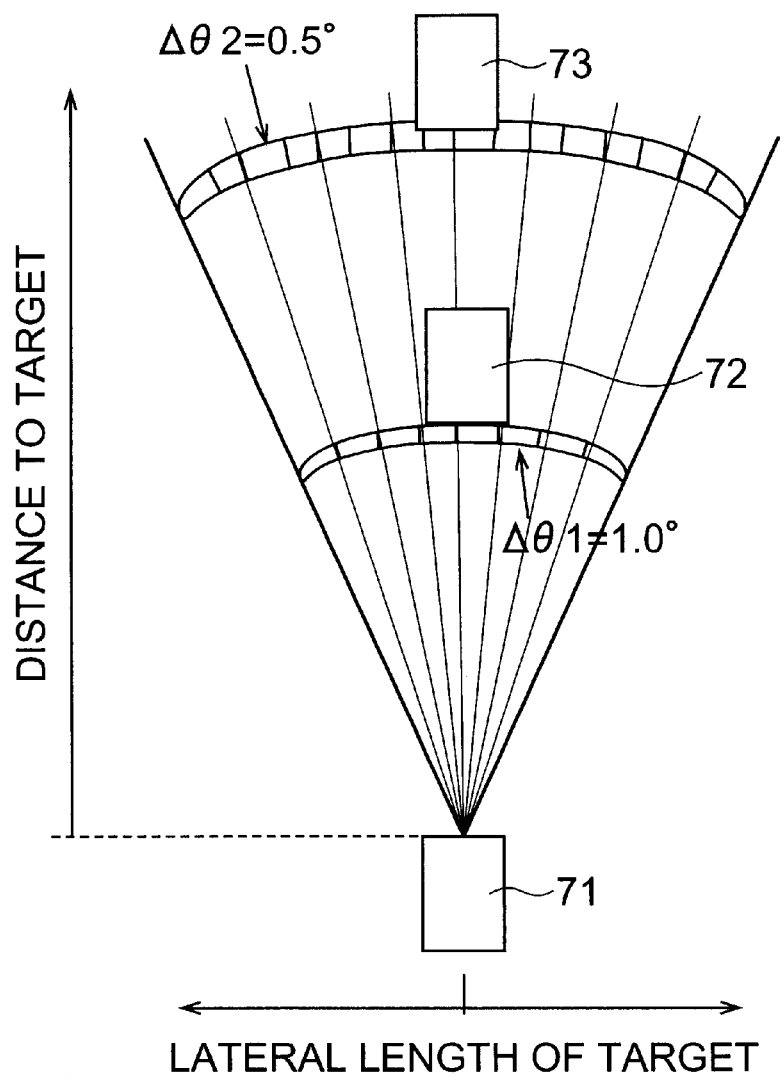
FIG. 27 is a diagram to schematically show the relation between the scan pitch angle and the target distance of the radar apparatus of the ninth embodiment.

FIG. 27 is a diagram to schematically show the relation between the target distance and the scan pitch angle of the DBF radar apparatus of the present embodiment.

When a car 72 is running ahead of a car 71 equipped with the present apparatus, the beat frequency f1 corresponding to the distance of the car 72 is detected in step S313 and thus the DBF synthesis process is executed at intervals of the scan pitch angle Δθ1 (for example, 1.0°) corresponding to the beat frequency f1. When step S313 results in detecting the beat frequency f2 corresponding to a car 73 approximately two times farther than the car 72, the DBF synthesis process is carried out at intervals of the scan pitch angle Δθ2 (for example, 0.5°) corresponding to the beat frequency f2.

The present embodiment includes step S312 and step D313 for detecting the approximate distance where the target exists, prior to the DBF synthesis process, so as to decrease the operational load for the DBF synthesis process, but it is also possible to omit the step S312 and step S313.

In that case, a preset beat frequency range is divided into a plurality of frequency intervals and the DBF synthesis process is carried out at intervals of the scan pitch angle according to the beat frequency for each of the frequency intervals.

As described above, the DBF radar apparatus of the present invention is arranged to decrease the scan pitch angle for the DBF synthesis process with increase in the distance to the target. Accordingly, the apparatus can reduce the drop rate of the length resolution in the scanning direction, which normally degrades with increase in the distance of the target, and, in turn, it is feasible to keep the resolution constant, regardless of the target distance.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radar apparatus comprising:
   a transmitter for outputting a local signal;
   a reception array antenna having a plurality of antenna elements;
   a receiver coupled to the plurality of antenna elements for receiving the local signal; and
   a processor coupled to an output of the receiver, said processor comprising:
      first bearing detecting means for detecting a bearing of a target by carrying out signal processing on individual element signals received on an element-by-element basis through said respective antenna elements; and
      second bearing detecting means for detecting a bearing of a target by carrying out signal processing different from that of said first bearing detecting means, on the individual element signals received through said respective antenna elements.

2. The radar apparatus according to claim 1,
   wherein said first bearing detecting means imposes a lighter operational load for detection of the target bearing than said second bearing detecting means, and
   wherein said second bearing detecting means possesses a higher target bearing resolution than said first bearing detecting means.

3. The radar apparatus according to claim 2, wherein said first bearing detecting means is applied to detection of a target existing in a relatively near range and said second bearing detecting means to detection of a target existing in a relatively far range.

4. The radar apparatus according to claim 3, wherein a transmitted signal of frequency-modulated continuous wave is used and the distance to the target is acquired from a beat frequency between said transmitted signal and a received signal through said reception array antenna.

5. The radar apparatus according to claim 4, comprising a reception circuit for mixing said transmitted signal with the received signals received through said plurality of antenna elements to acquire beat signals and converting the beat signals obtained corresponding to said respective antenna elements, to digital beat signals,
   wherein said first bearing detecting means is means for carrying out a digital beamforming process on said plurality of element-by-element digital beat signals to form an antenna beam in a plurality of directions and detecting the bearing of said target, and
   wherein said second bearing detecting means is means for carrying out an analysis by digital signal processing on a phase difference between said plurality of element-by-element digital beat signals to detect the bearing of said target as point information.

6. The radar apparatus according to claim 5, wherein said first bearing detecting means detects the bearing of said target, using a frequency component of the beat frequency not more than a predetermined value out of said element-by-element digital beat signals, and
   wherein said second bearing detecting means detects the bearing of said target, using a frequency component of the beat frequency larger than said predetermined value out of said element-by-element digital beat signals.

7. The radar apparatus according to claim 6, comprising beat frequency detecting means for detecting a beat frequency indicating an approximate distance at which a target is assumed to exist, prior to the detection of the bearing of the target by said first baring detecting means or by said second bearing detecting means.

8. The radar apparatus according to claim 7, wherein at least either one of said first bearing detecting means and said second bearing detecting means is means for carrying out said target bearing detection with a limitation to the beat frequency component acquired by said beat frequency detecting means.

9. The radar apparatus according to claim 5, wherein said first bearing detecting means is means for detecting the bearing of said target from a position of a peak in a power distribution with a variable of bearing and detecting a width of said target from a width of the distribution at a position where power is lowered by a predetermined amount from said peak position.

10. The radar apparatus according to claim 9, wherein when the target width detected by said first bearing detecting means is not less than a predetermined value, the bearing of the target is again detected at the same beat frequency by said second bearing detecting means.

11. The radar apparatus according to claim 5, wherein said second bearing detecting means is means for detecting the target bearing by an analytical operation using an adaptive array antenna filter and wherein initial values of weights in said analytical operation are set based on the result of recognition by said first bearing detecting means.

12. The radar apparatus according to claim 5, wherein said second bearing detecting means is means for detecting the target bearing by an analytical operation using an adaptive array antenna filter and wherein initial values of weights in said analytical operation are set based on the result of target recognition in previous detection.

13. The radar apparatus according to claim 4, which comprises:
   a reception circuit for mixing said transmitted signal with the received signals received through said plurality of antenna elements to acquire beat signals and converting the beat signals obtained corresponding to said respective antenna elements, to digital beat signals, and
   beat frequency detecting means for detecting a beat frequency indicating an approximate distance at which a target is assumed to exist,
   wherein each of said first and second bearing detecting means is means for carrying out a digital beamforming process on a predetermined frequency component of said plurality of element-by-element digital beat signals to form an antenna beam in a plurality of directions and detecting the bearing of said target,
   wherein said first bearing detecting means performs the digital beamforming process for a frequency detected by said beat frequency detecting means and being not more than a predetermined frequency or for a frequency near said frequency, and
   wherein said second bearing detecting means is means for performing the digital beamforming process for all frequencies from said predetermined frequency to a maximum frequency of a detection range.

14. The radar apparatus according to claim 13, which is mounted on a vehicle, said vehicle comprising lane shape acquiring means for acquiring a shape of a lane on which said vehicle is running,
   wherein when it is determined that a target detected is present on the lane acquired by said lane shape acquiring means, said first and second bearing detecting means suspend the digital beamforming process based on the beat signal acquired at that time for beat frequencies larger than a beat frequency corresponding to that target.

15. The radar apparatus according to claim 4, comprising a reception circuit for mixing said transmitted signal with the received signals received through said plurality of antenna elements to acquire beat signals and converting the beat signals obtained corresponding to said respective antenna elements, to digital beat signals,
   wherein said first and second bearing detecting means are means for carrying out a digital beamforming process on said plurality of element-by-element digital beat signals to form an antenna beam in a plurality of directions and detecting the bearing of said target, and
   wherein the number of said antenna beams formed per unit angle in said first bearing detecting means is smaller than the number of said antenna beams formed per unit angle in said second bearing detecting means.

16. The radar apparatus according to claim 15, wherein said first bearing detecting means performs the digital beamforming process on a frequency component not more than a predetermined value out of said plurality of element-by-element digital beat signals, and
   wherein said second bearing detecting means performs the digital beamforming process on a frequency component larger than said predetermined value out of said plurality of element-by-element digital beat signals.

17. The radar apparatus according to claim 15, comprising beat frequency detecting means for detecting a beat frequency indicating an approximate distance at which a target is assumed to exist,
   wherein said first and second bearing detecting means perform said digital beamforming process with a limitation to the beat frequency component detected by said beat frequency detecting means.

* * * * *

UNITED STATES PATENT AND TRADEMARK OFFICE
CERTIFICATE OF CORRECTION

PATENT NO. : 6,573,859 B2
DATED : June 3, 2003
INVENTOR(S) : Setsuo Tokoro

It is certified that error appears in the above-identified patent and that said Letters Patent is hereby corrected as shown below:

<u>Column 26,</u>
Line 40, "baring" should read -- bearing --.

Signed and Sealed this

Seventh Day of October, 2003

JAMES E. ROGAN
*Director of the United States Patent and Trademark Office*